United States Patent
Olivero et al.

(10) Patent No.: US 10,132,490 B1
(45) Date of Patent: Nov. 20, 2018

(54) INTERACTIVE APPAREL ECOSYSTEMS

(71) Applicant: Fung Academy Limited, Kowloon (CN)

(72) Inventors: Giorgio Olivero, Sai Ying Pun (CN); Carlos Conde Bande, Ourense (ES); Mathias Dahlstrom, Marstrand (SE); Edward Lynn Tsai, Rowland Hts, CA (US); Lisa Hopey, Oakland, CA (US)

(73) Assignee: Fung Academy Limited, Kowloon (CN)

( * ) Notice: Subject to any disclaimer, the term of this patent is extended or adjusted under 35 U.S.C. 154(b) by 0 days.

(21) Appl. No.: 15/786,531

(22) Filed: Oct. 17, 2017

(51) Int. Cl.
| | |
|---|---|
| *F21V 33/00* | (2006.01) |
| *G06T 7/90* | (2017.01) |
| *H05B 37/02* | (2006.01) |
| *A41D 1/00* | (2018.01) |
| *A41D 1/22* | (2018.01) |
| *F21W 121/06* | (2006.01) |

(52) U.S. Cl.
CPC .......... *F21V 33/0008* (2013.01); *A41D 1/002* (2013.01); *A41D 1/22* (2013.01); *G06T 7/90* (2017.01); *H05B 37/0227* (2013.01); *H05B 37/0236* (2013.01); *H05B 37/0272* (2013.01); *F21W 2121/06* (2013.01); *G06T 2207/10024* (2013.01)

(58) Field of Classification Search
CPC ...................................................... G06T 7/90
See application file for complete search history.

(56) References Cited

U.S. PATENT DOCUMENTS

| | | | |
|---|---|---|---|
| 4,570,206 A | 2/1986 | Deutsch | |
| 4,602,191 A | 7/1986 | Davila | |
| 4,709,307 A | 11/1987 | Branom | |
| 5,537,211 A * | 7/1996 | Dial .................. | G01J 3/524 |
| | | | 356/402 |
| 7,500,917 B2 | 3/2009 | Barney et al. | |
| 8,387,284 B2 | 3/2013 | Baum | |
| 8,423,080 B2 | 4/2013 | Linjama et al. | |

(Continued)

FOREIGN PATENT DOCUMENTS

| | | |
|---|---|---|
| CN | 203004684 U | 6/2013 |
| CN | 104298839 A | 1/2015 |

(Continued)

*Primary Examiner* — Thuy Vinh Tran
(74) *Attorney, Agent, or Firm* — Seed IP Law Group LLP

(57) ABSTRACT

Ecosystems and related devices, methods, and systems are provided. An ecosystem includes a sensing implement that has one or more sensing implement light sources, one or more remote accessories that has one or more accessory light sources, and control circuitry that communicably couples the sensing implement to the one or more remote accessories. The control circuitry in operation determines a color of an object based on one or more signals received indicative of the color of the object, and generates one or more signals to cause the one or more sensing implement light sources to illuminate the sensing implement in a color that substantially matches the color of the object. The control circuitry in operation can also generate one or more signals to cause the one or more accessory light sources to illuminate the one or more remote accessories in a color that substantially matches the color of the object.

30 Claims, 13 Drawing Sheets

(56) References Cited

U.S. PATENT DOCUMENTS

| | | |
|---|---|---|
| 8,444,450 B2 | 5/2013 | Shibahashi et al. |
| 8,476,519 B2 | 7/2013 | Liotta |
| 8,641,470 B2 | 2/2014 | Ong et al. |
| 8,650,764 B2 | 2/2014 | Hartford et al. |
| 8,732,866 B2 | 5/2014 | Genz et al. |
| 8,840,263 B1 | 9/2014 | Jones |
| 8,919,982 B2 | 12/2014 | Pulido, Jr. |
| 8,937,444 B2 | 1/2015 | Ogg et al. |
| 9,086,215 B2 | 7/2015 | Timmerberg |
| 9,189,022 B2 | 11/2015 | Burgess |
| 9,282,893 B2 | 5/2016 | Longinotti-Buitoni et al. |
| 9,330,558 B2 | 5/2016 | Logan et al. |
| 9,368,006 B1 | 6/2016 | Gorilovsky |
| 9,371,986 B2 | 6/2016 | Nelson |
| 9,430,997 B2 | 8/2016 | Hardi et al. |
| 9,470,411 B1 | 10/2016 | Ramsey |
| 9,480,119 B2 | 10/2016 | Mason et al. |
| 9,520,117 B2 | 12/2016 | Dourmashkin et al. |
| 9,665,187 B2 | 5/2017 | Shu |
| 2007/0170449 A1 | 7/2007 | Anandan |
| 2008/0258999 A1 | 10/2008 | Van Doorn |
| 2009/0052167 A1 | 2/2009 | Ono |
| 2014/0117875 A1 | 5/2014 | Kane |
| 2015/0015486 A1 | 1/2015 | Osman et al. |
| 2015/0141085 A1 | 5/2015 | Nuovo et al. |
| 2015/0179141 A1* | 6/2015 | Dabhi ............ G09G 5/06 345/594 |
| 2015/0228249 A1 | 8/2015 | Lee et al. |
| 2015/0332057 A1 | 11/2015 | Chang et al. |
| 2016/0112654 A1 | 4/2016 | Seo et al. |
| 2016/0179066 A1 | 6/2016 | Chadwick et al. |
| 2016/0348888 A1 | 12/2016 | Drews |

FOREIGN PATENT DOCUMENTS

| | | |
|---|---|---|
| CN | 204242564 U | 4/2015 |
| CN | 105114904 A | 12/2015 |
| CN | 106858770 A | 6/2017 |

* cited by examiner

INTERACTIVE APPAREL ECOSYSTEMS

BACKGROUND

Technical Field

The present disclosure is generally related to apparel systems that provide an interactive ecosystem with one or more accessories.

Description of the Related Art

By way of background, people, e.g., children, are often attracted to costumes and other accessories associated with popular fictional characters, such as Disney princesses. Such costumes and accessories, e.g., clips, tiaras, etc., are not typically connected to an ecosystem that integrates the costumes and accessories together. What's more, integrating costumes and other accessories into an ecosystem that creates a sense of magic to a child user by generating lighting schemes is lacking. For example, devices exist that include a button that requires a user to manually press the button to cause the device to sense color of an object which is of a color the user is interested in emulating via activatable lights disposed in an accessory, such as a bag. Other examples include a dress that includes a vibration sensor that is motion-activated, such that when the vibration sensor senses motion, it causes lights associated with the dress to light-up.

These devices, however, do not have an ecosystem that automates an implement that senses color of an object to change a color of the implement to match the sensed color while coordinating with one or more remote accessories to cause them to match the sensed color to create a sense of magic for the users of such systems.

BRIEF SUMMARY

Various implementations of systems, devices, apparatuses, and methods described herein can provide an ecosystem that creates a sense of magic to end users with efficient, compact, and robust form factors. For example, in an implementation, an ecosystem can include a sensing implement including one or more sensing implement light sources, one or more remote accessories including one or more accessory light sources, and control circuitry that communicably couples the sensing implement to the one or more remote accessories. The control circuitry, in operation, can determine a color of an object based on one or more signals received indicative of the color of the object, generate one or more signals to cause the one or more sensing implement light sources to illuminate the sensing implement in a color that substantially matches the color of the object, and generate one or more signals to cause the one or more accessory light sources to illuminate the one or more remote accessories in a color that substantially matches the color of the object.

In an implementation, a method can receiving, by at least one microprocessor, one or more signals at a sensing implement, the one or more signals identifying a color of an object. The method can include, in response to the receiving the one or more signals at the sensing implement, illuminating, by at least one microprocessor, the sensing implement in a color that substantially matches the color of the object via one or more sensing implement light sources, and communicating wirelessly, by at least one microprocessor, one or more signals to one or more remote accessories, the one or more signals indicative of the color of the object. The method can include causing, by the communicating wirelessly the one or more signals to one or more remote accessories, the one or more remote accessories to illuminate in a color that substantially matches the color of the object via one or more remote accessory light sources.

In an implementation, a system can include a sensing implement, one or more light sources disposed in the sensing implement, a color sensor disposed in the sensing implement, which in operation, generates one or more signals indicative of a color of an object, one or more remote accessories, one or more accessory light sources disposed in the one or more remote accessories, and control circuitry coupled to the sensing implement. The control circuitry, in operation, can determine color based on the one or more signals indicative of the color of the object, communicate with the one or more light sources disposed in the sensing implement to cause the sensing implement to illuminate in a color that substantially matches the color of the object, and communicate with the one or more remote accessories the determined color of the object to cause the one or more remote accessories to illuminate in the color that substantially matches the color of the object.

In an implementation, an ecosystem can include a sensing implement having one or more sensors to estimate a color of an object, and one or more sensing implement light sources. The ecosystem can include one or more remote accessories including one or more accessory light sources, at least one controller, communicably coupled to the one or more sensors, the controller to receive one or more signals from the one or more sensors, each of the one or more signals including data indicative of a color sensed by the one or more sensors, and a controller-readable, machine-executable, instruction set stored in a nontransitory storage medium communicably coupled to the at least one controller, that when executed by the at least one controller, causes the at least one controller to at least determine the color of the object, responsive at least in part to the determination of the color, provide at least one color output signal to the sensing implement light sources, and communicate the at least one color output signal to the accessory light sources.

In an implementation, a sensing implement operable in an ecosystem, the sensing implement can include one or more color sensors which sense a color of an object, one or more light sources, one or more motion sensors that detect movement of the sensing implement, and a controller communicably coupled to the one or more sensors and the one or more motion sensors. The controller, in response to sensing of the color of the object, can cause the one or more light sources to illuminate the sensing implement in a color that substantially matches the color of the object sensed by the one or more color sensors.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments or implementations. However, one skilled in the relevant art will recognize that embodiments or implementations may be practiced without one or more of these specific details, or with other methods, systems, components, materials, etc. In other instances, well-known structures associated with transmitters, receivers, transceivers, networks, servers, apparels, toys, and/or children's accessories have not been shown or described in detail to avoid unnecessarily obscuring descriptions of the embodiments or implementations.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment or implementation" or "an embodiment or implementation" means that a particular feature, structure or characteristic described in connection with the embodiment is included in at least one embodiment. Thus, the appearances of the phrases in one embodiment or implementation or in an embodiment or implementation in various places throughout this specification are not necessarily all referring to the same embodiment. Furthermore, the particular features, structures, or characteristics may be combined in any suitable manner in one or more embodiments or implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments or implementations.

Figure 1:
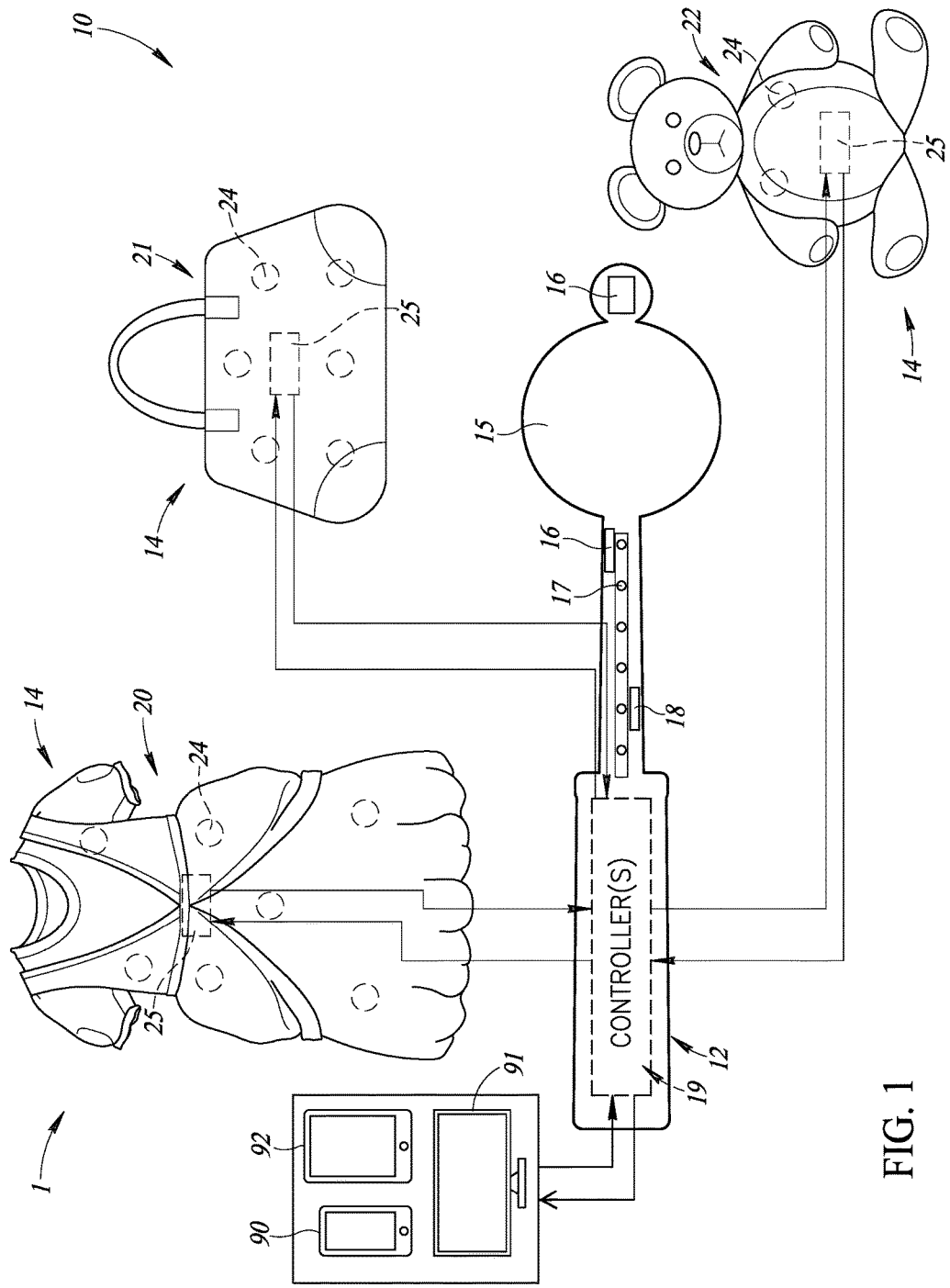
FIG. 1 is a schematic view of an ecosystem, according to one non-limiting, example implementation, illustrating an environment of the ecosystem.

FIG. 1 illustrates an environment 1 of an ecosystem 10, according to one non-limiting, example implementation. The ecosystem 10 includes a sensing implement 12 and one or more remote accessories 14. The sensing implement 12 illustrated in FIG. 1 can take various forms, including a magic wand 15 as illustrated therein. For example, in other implementations, the sensing implement 12 can take the form of a pen, stone, cloak, a probe, a crystal, or other toys or objects that one may associate with having magical powers. In general, although the magic wand 15 is described in various implementations, other forms or shapes are within the scope of the disclosed subject matter. The magic wand 15 can include one or more sensor(s) 16, light source(s) 17, motor(s) 18, controller(s) 19, etc., that allow a user, such as a child, to tap the magic wand 15 on any desired object, which causes the one or more sensor(s) 16 to detect a color of the object. The light source(s) 17 of the magic wand 15 illuminate the magic wand 15 to match the sensed color of the object.

The one or more remote accessories 14 can take a wide variety of forms. For example, in the implementation of FIG. 1, one remote accessory 14 takes the form of a dress 20. Another remote accessory 14 takes the form of a hand bag 21. Another remote accessory 14 takes the form of a teddy bear 22. In general, the remote accessory 14 can take other forms; for example, in some implementations, the remote accessory 14 can take the form of a mobile device 90, a personal computer 91, a tablet 92, a digital media player, game controllers, or other personal computing device. In some implementations, the remote accessory 14 can the form of various household items, such as lamps, desks, ceilings, candleholders, etc. In some implementations, the remote accessory can take the form of a tiara, a band, a shoe, or other accessories that may be worn by a user. As such, the one or more remote accessories 14 can take the form of any object that is positioned remote from the sensing implement 12.

The magic wand 15 is communicably coupled to the one or more remote accessories 14. In general, upon detection of the sensed color by tapping the magic wand 15 on an object, the magic wand 15 communicates with the one or more remote accessories 14 to pair the magic wand 15 with the one or more remote accessories 14. Upon establishing such a pairing relationship, the color that is sensed is communicated to the one or more remote accessories 14. Each of the one or more remote accessories 14 includes one or more light source(s) 24 and one or more paired device controller(s) 25 that receives signals indicative of the sensed color. Thereafter, the light source(s) 24 of the one or more accessories 14 illuminate the one or more remote accessories 14 in a color that matches the sensed color of the object.

In this manner, a user can tap the sensing implement 12, e.g., the magic wand 15, on an object, which causes the magic wand 15 to detect the color of the object and cause the light sources 17 to illuminate the magic wand 15 in a color that matches the color of the sensed color. Further, upon establishing the pairing relationship with the one or more remote accessories 14, e.g., dress 20, hand bag 21, teddy bear 22, etc., the sensed color is communicated to the controller(s) 25 of the one or more remote accessories 14. The one or more remote accessories 14 are thereafter illuminated via, for example, the light source(s) 24, to match the sensed color, which can create a sense of magic for the user.

Figure 2:
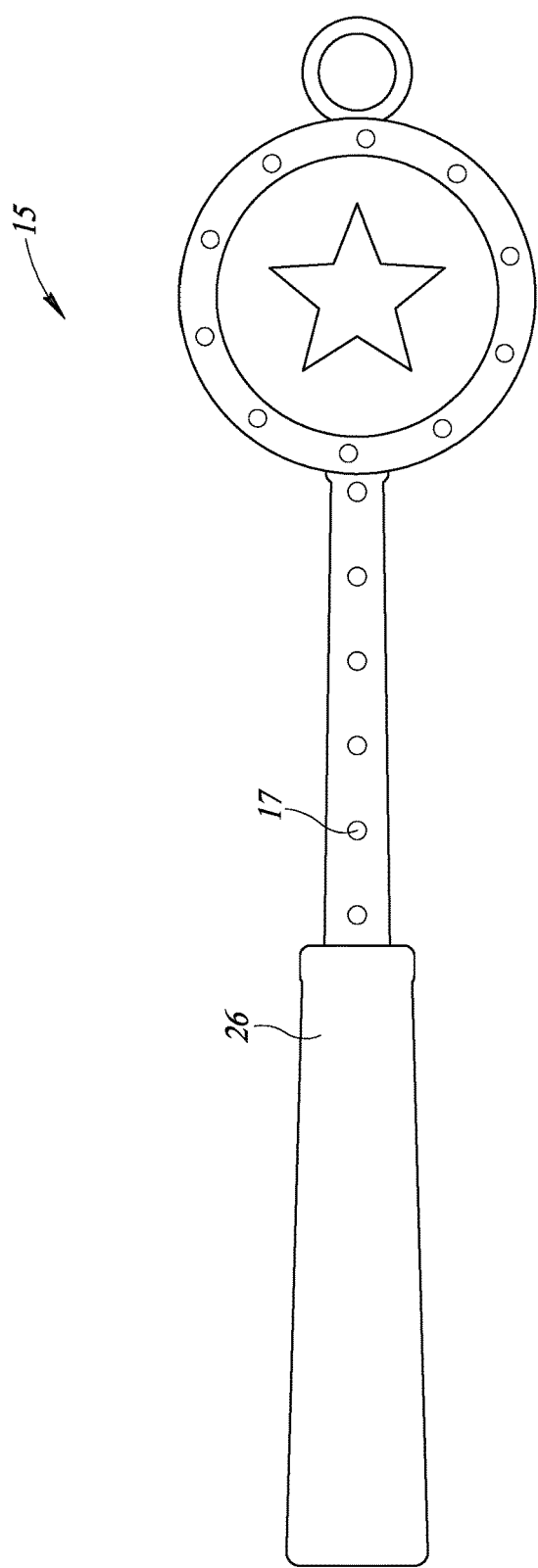
FIG. 2 is a perspective view of a sensing implement, according to one non-limiting, example implementation, in the form of a magic wand.
Figure 3:
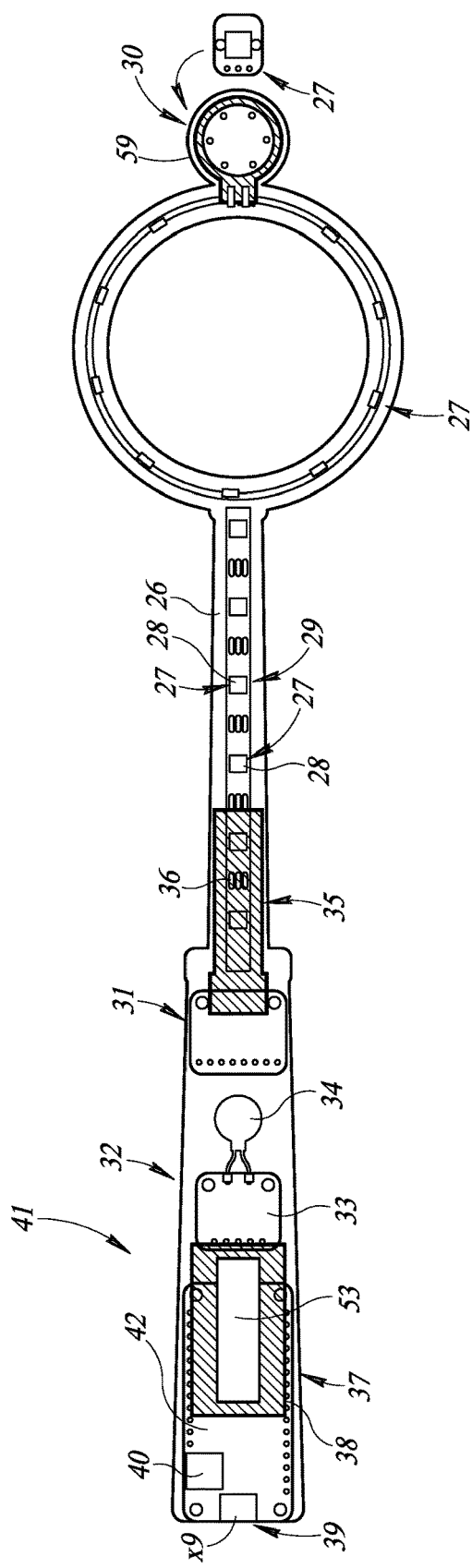
FIG. 3 is a sectional view of the sensing implement of FIG. 2.

FIGS. 2 and 3 illustrate the magic wand 15, according to one non-limiting, example implementation. The magic wand 15 includes a housing 26 that is sized and shaped to house one or more components of the magic wand 15. The housing 26 can comprise any suitable material, such as plastics, metals, etc., and can include one or more diffuser materials, for example, in the form of diffuser films. As described above, the magic wand 15 includes one or more light source(s) 17. The light source(s) 17, in some implementations, can take the form of one or more light emitting diodes (LED) 27, e.g., Red, Green, Blue ("RGB") LEDs, that can be in the form of LED strips 28. In general, the one or more diffuser materials of the housing 26 are sized and shaped to be disposed in, on, or adjacent to the LEDs 27 that diffuse light rays emitted by the LEDs 27. The LEDs 27, for example in the form of LED strips 28, are disposed in the housing 26. For example, a housing body may include recesses 29 that are sized and shaped to receive the LED strips 28. For example, in some implementations, as illustrated in FIG. 3, an LED 27 may be disposed proximate to the color sensor 30. In particular, the housing 26 may include a cylindrical tip portion 59 with one side including the color sensor 30, and one LED 27 being disposed on the other side of the cylindrical tip portion.

As described above, the magic wand 15 includes one or more sensor(s) 16. The one or more sensor(s) 16 can include one or more color sensor(s) 30 that can detect color or color profile of an object. More broadly, the one or more color sensor(s) 30 can take a wide variety of forms, such as comprise charge coupled devices (CCD), ceramic metal oxide sensors (CMOS), phototransistors, or photodiodes. Furthermore, each of the one or more sensor(s) 30 may be an assembly or collection of multiple such devices employing visible filters or neutral density filters at the optical aperture of the sensors. Additionally, this sensor may be a chip type device incorporating multiple such sensors and color filters in a single package. Arrays packaged in this manner may incorporate a means of changing gain settings to modify the luminous flux output characteristics of the device via pin jumper settings. Sensors, sensor arrays, or sensor assemblies are generally capable of communicating with a controller via an analog or digital interface. The sensor or sensors 30 may employ a transimpedance circuit to convert discreet current outputs to voltages and an integrated analog to digital converter circuit to combine the outputs of multiple sensors on a single digital or serial interface.

The one or more color sensor(s) 16 of the magic wand 15 can also include one or more motion sensor(s) 31. The one or more motion sensor(s) 31 can take a wide variety of forms, for example, a gyroscope, an accelerometer, a magnetometer, contact switches, and/or another inertial measurement unit (IMU). In general, the one or motion sensor(s) 31 senses or captures certain defined gestures or movements of the magic wand 15. For example, the one or more motion sensor(s) 31 senses when the magic wand 15 is tapped on an object. Furthermore, the one or more motion sensor(s) 31 can discern between lifting or general movement of the magic wand 15 and contact with an object, such as tapping of the magic wand 15 on the object. For example, the one or more motion sensor(s) 31 can include filters, amplifiers, feedback circuits, gates, etc., that are known in the art to discern between a wide variety of gestures and events, such as movement, contact, etc.

The magic wand 15 optionally includes a motion response sub-system 32 that provides tactile (e.g., vibration) or haptic (e.g., sensation of engaging a bump or a recess) feedback. For example, the motion response sub-system 32 can include a motor controller 33 and a vibration motor 34, and associated circuitry, for example, a printed circuit board. The motion response sub-system 32 in general provides tactile or haptic feedback upon occurrence of certain events. For example, in some implementations, the motion response sub-system 32 can provide tactile or haptic feedback when the magic wand 15 is lifted, tapped on an object, color sensor 30 senses a color of the object, or any other event to indicate to the user occurrence of such.

As illustrated in FIGS. 2 and 3, the magic wand 15 can also optionally include an audio sub-system 35. The audio sub-system 35 can include auditory transducer(s) 36, for example, a speaker that emits audible sounds upon occurrence of certain defined events, and associated circuitry, for example, a printed circuit board. For example, the audio sub-system 35 can emit sounds indicative of various states of the magic wand 15, the color sensed, etc. In particular, the audio sub-system 35 can emit sounds indicative of the magic wand 15 being in a sleep or wake mode or state upon movement or lack of movement of the magic wand 15, when a color of an object is sensed, and the color sensed, for example, red, green, blue, yellow, etc.

The magic wand 15 includes a power sub-system 37 that provides electrical power to one or more components of the magic wand 15. In some implementations, the housing 26 can include a battery compartment 38, illustrated schematically for the sake of clarity of description and illustration, that is sized and shaped to receive one or more electrical energy storage devices 53, for example, individual lithium-ion batteries or alkaline batteries that are packaged together to provide electrical power. More generally, such a battery compartment 38 includes electrical components that make electrical connection between the one or more individual lithium-ion batteries and primary negative and positive electrical terminals of the battery compartment 38. The negative and positive electrical terminals of the battery compartment 38 can be connected to corresponding negative and positive electrical terminals of various components of the magic wand 15 to provide electrical power to such components.

The housing 26 of the magic wand 15 can include one or more ports. For example, the housing 26 can include an external device port 39 and a charging port 40. The external device port 39 can be a USB port, a mini USB port, or another serial or parallel port that allows the magic wand 15 to communicate with an external device, such as a personal computer, mobile device, etc. The charging port 40 can allow the magic wand 15 to be coupled to an external power source. For example, the external power source can supply electrical power to charge the one or more electrical energy storage devices received in the battery compartment 38.

As described in further detail below, the magic wand 15 includes a control system 41 that performs various functions of the magic wand 15 and integrates various components of the magic wand 15. The control system 41 may include a controller 42, illustrated schematically for the sake of clarity of illustration and description, that is communicably coupled to motion response sub-system 32, audio sub-system 35, power sub-system 37, motion sensor(s) 31, color sensor(s) 30, light source(s) 17, etc. Moreover, in some implementations, the controller 42, in lieu of, in addition to, or in conjunction with, the one or more motion sensor(s) 31 can capture certain defined gestures and discern between lifting or general movement of the magic wand 15 and contact with an object, such as tapping of the magic wand 15 on the object. For example, the one or more motion sensor(s) 31 can send a signal(s) to the controller 42, which can capture the certain defined gestures and discern between lifting or general movement of the magic wand 15 and contact with an object.

While FIGS. 2 and 3 illustrate each of the various components of the magic wand 15, including the motion controller 33 individually, integrating such individual components and the associated circuitry into a main controller, for example, controller 42, is within the scope of the disclosed subject matter. As such, reference to the controller 42 can mean an integrated controller having such features. For example, each of such components may include a corresponding printed circuit board that may be integrated into a single printed circuit board of an integrated controller 42.

Figure 4:
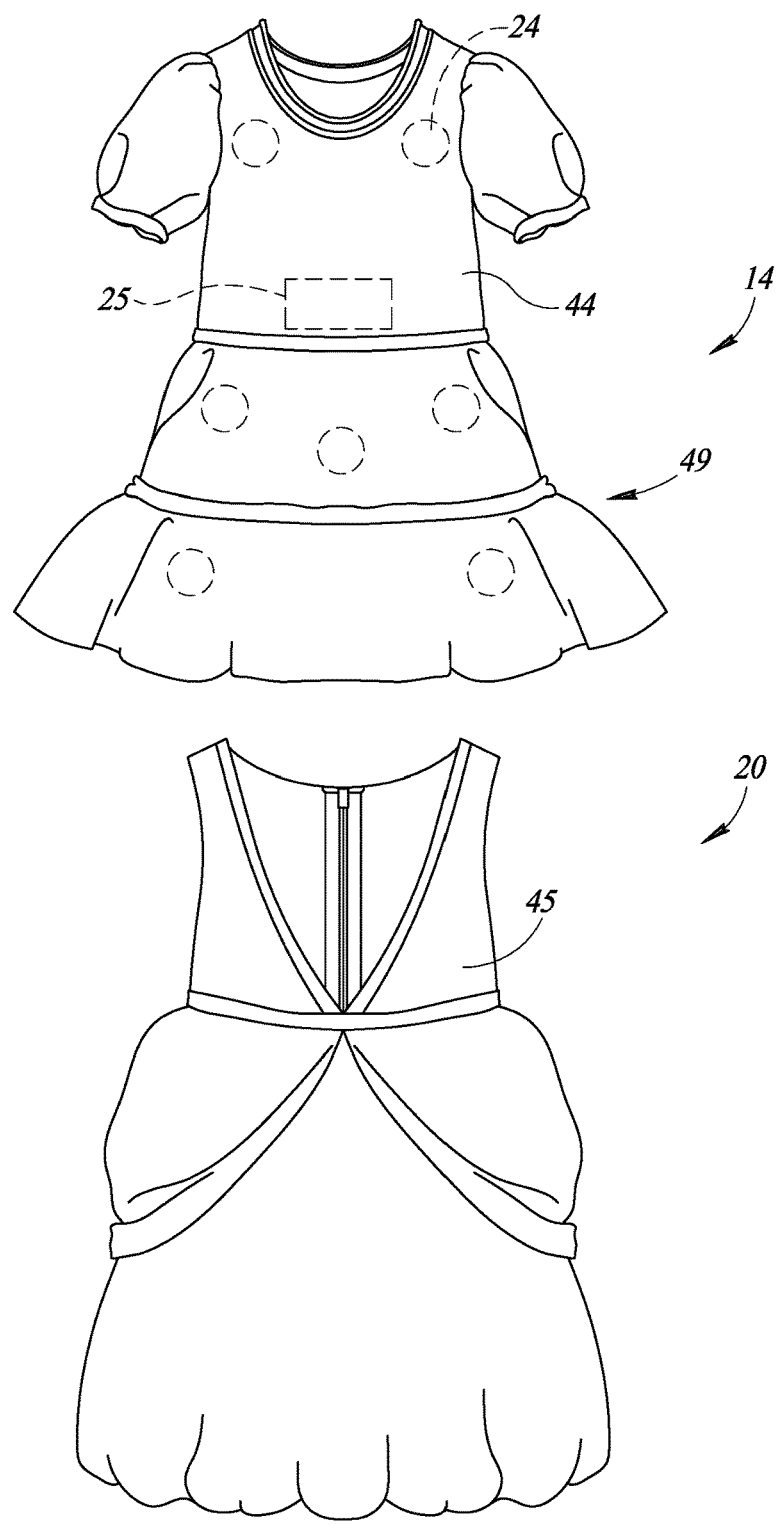
FIG. 4 is a partially exploded view of a remote accessory, according to one non-limiting, example implementation, in the form of a dress.

FIG. 4 illustrates a partially exploded view of the one or more remote accessories 14 in the form of the dress 20, according to one example implementation. Although FIG. 4 illustrates a dress 20 in one example, non-limiting implementation, other forms of apparel are within the scope of the disclosed subject matter. The dress 20 includes an outer layer 44 and an inner layer 45. The inner layer 45 is generally sized and shaped to be worn by a user and is in contact with the skin of the user, with the outer layer 44 worn on top of the inner layer 45. In this implementation, the outer layer 44 includes a plurality of light source(s) 24 that are communicably coupled to a controller 25 disposed on or in the outer layer 44. The one or more light source(s) 24 can take a wide variety of forms. For example, as illustrated in FIG. 4, the one or more light source(s) 24 can include light emitting diodes (LED), e.g., RGB LEDs. Again, in some implementations, the LEDs can be in the form of LED strips disposed in or on the outer layer 44. The outer layer 44 may include diffuser materials, for example in the form of diffuser films that diffuse light rays emitted by the LEDs. As described in more detail below, the controller 25 of the dress 20 is in communication with the controller 42 of the magic wand 15 via a control system 49. Again, as described above, other remote accessories 14 can also include similar light source(s) 24 and controllers 25, which are in communication with the controller 42. Although not illustrated for the sake of clarity of description and illustration, the dress 20 can include one or more power sources that deliver power to various components of the dress 20. For example, the one or more power sources can be in the form of one or more electrical energy storage devices that are received in a battery compartment disposed in the outer layer 45 of the dress 20.

Figure 5:
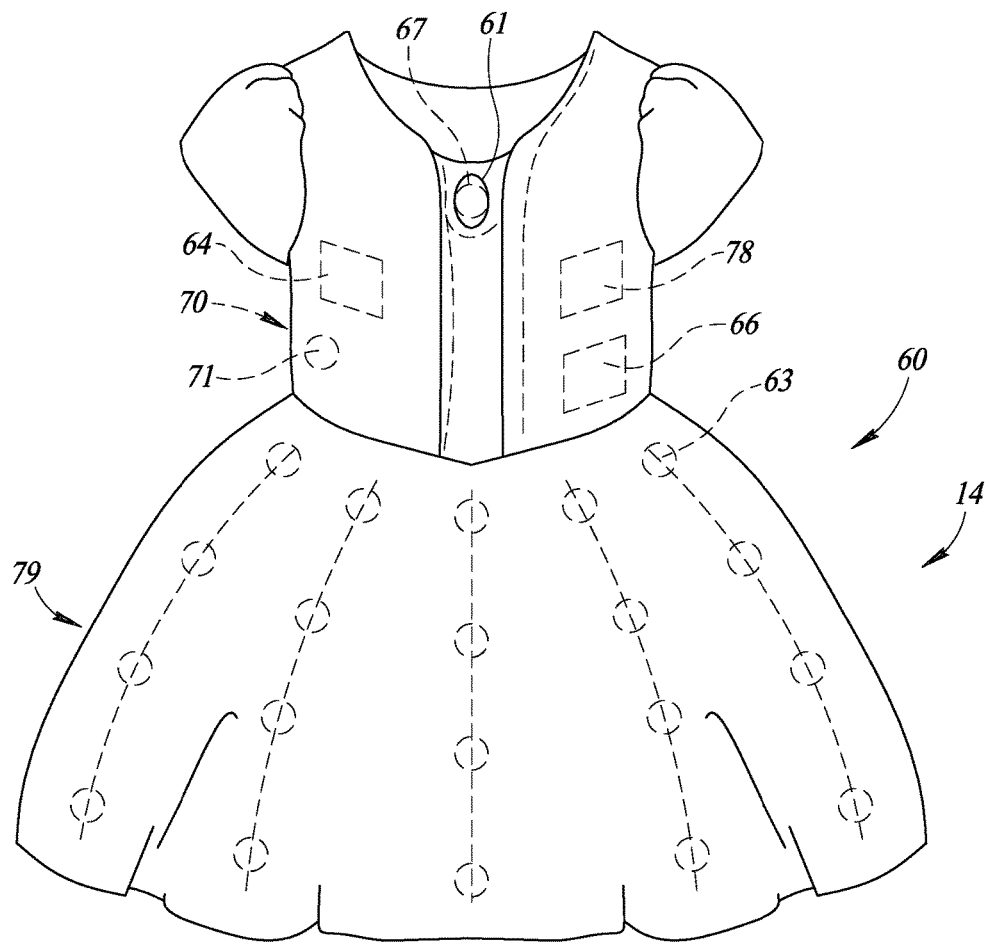
FIG. 5 is a perspective view of a remote accessory, according to one non-limiting, example implementation, in the form of a dress.

FIG. 5 illustrates a perspective view of the one or more remote accessories 14 in the form of a dress 60, according to one example, non-limiting implementation. Again, although FIG. 5 illustrates a dress 60 in one example, non-limiting implementation, other forms of apparel are within the scope of the disclosed subject matter. The dress 60 provides a variation in which the dress includes an activation device 61 in the form of a brooch. However, other forms and shapes of the activation device 61 are within the scope of the disclosed subject matter. The dress 60 includes an outer layer and an inner layer, similar to the implementation described in FIG. 4. The dress 60 also includes one or more light sources 63, such as LEDs, e.g., RGB LEDs, that can take a wide variety of forms and shapes as described above. For example, the LEDs can be in the form of LED strips disposed in or on the outer layer. The activation device 61 can be located in the outer layer, for example, positioned in a recess disposed in the outer layer, such that portions of the activation device 61 are accessible to a user. In this implementation, the activation device 61 is communicably coupled to a controller 64 of the dress 60.

The dress 60 includes one or more sensor(s) that may include a motion sensor 66 and a touch sensor 67. The motion sensor 66 can take a wide variety of forms, for example, a gyroscope, an accelerometer, a magnetometer, contact switches, and/or another inertial measurement unit (IMU). In general, the one or motion sensor 66 senses or captures certain defined gestures or movements of the dress 60. The touch sensor 67 may be any capacitive or inductive touch sensor and is disposed in the actuation device 61. In general, the touch sensor 67 senses human touch at least on a portion of the activation device 61.

The dress 60 may optionally also include an audio sub-system 70. The audio sub-system 70 may be similar to the audio sub-system 35 and may include auditory transducer(s) 71, for example, a speaker that emits audible sounds upon occurrence of certain defined events, and associated circuitry, for example, a printed circuit board. For example, the audio sub-system 70 can emit sounds indicative of various states of the dress 60, the color sensed, etc. In particular, the audio sub-system 70 can emit sounds indicative of the dress 60 being in a sleep or wake mode or state upon movement or lack of movement of the dress 60, when a color of an object is sensed, and the color sensed, for example, red, green, blue, yellow, etc.

The dress 60 includes a power sub-system 78 that provides electrical power to one or more components of the dress 60. In some implementations, the dress 60, for example, the outer layer thereof, can include a battery compartment that is sized and shaped to receive one or more electrical energy storage devices, for example, individual lithium-ion batteries or alkaline batteries that are packaged together to provide electrical power. The battery compartment of the dress 60 may be similar to the battery compartment 38. The dress 60 may also include one or more ports. For example, the dress 60 may include an external device port and a charging port. The external device port can be a USB port, a mini USB port, or another serial or parallel port that allows the dress 60 to communicate with an external device, such as a personal computer, mobile device, etc. The charging port can allow the dress 60 to be coupled to an external power source. For example, the external power source can supply electrical power to charge the one or more electrical energy storage devices received in a battery compartment of the dress.

As described in further detail below, the dress 60 can include a control system 79 that performs various functions of the dress 60 and integrates various components of the dress 60. The control system 79 may include the controller 64, illustrated schematically for the sake of clarity of illustration and description, that is communicably coupled to audio sub-system 70, power sub-system 78, motion sensor(s) 66, touch sensor(s) 67, activation device 61, light source(s) 63, etc.

Moreover, it should be noted that although various components of the dress 60, such as the controller 64, audio sub-system 70, power sub-system 78, motion sensor(s) 66, touch sensor(s) 67, activation device 61 are schematically illustrated individually in various locations, in some implementations, such components can be integrated into a single component. For example, a housing of the activation device 61 can include such components in a single location, or other components may be provided in the dress 60 that include such components integrated into a single component.

Figure 6:
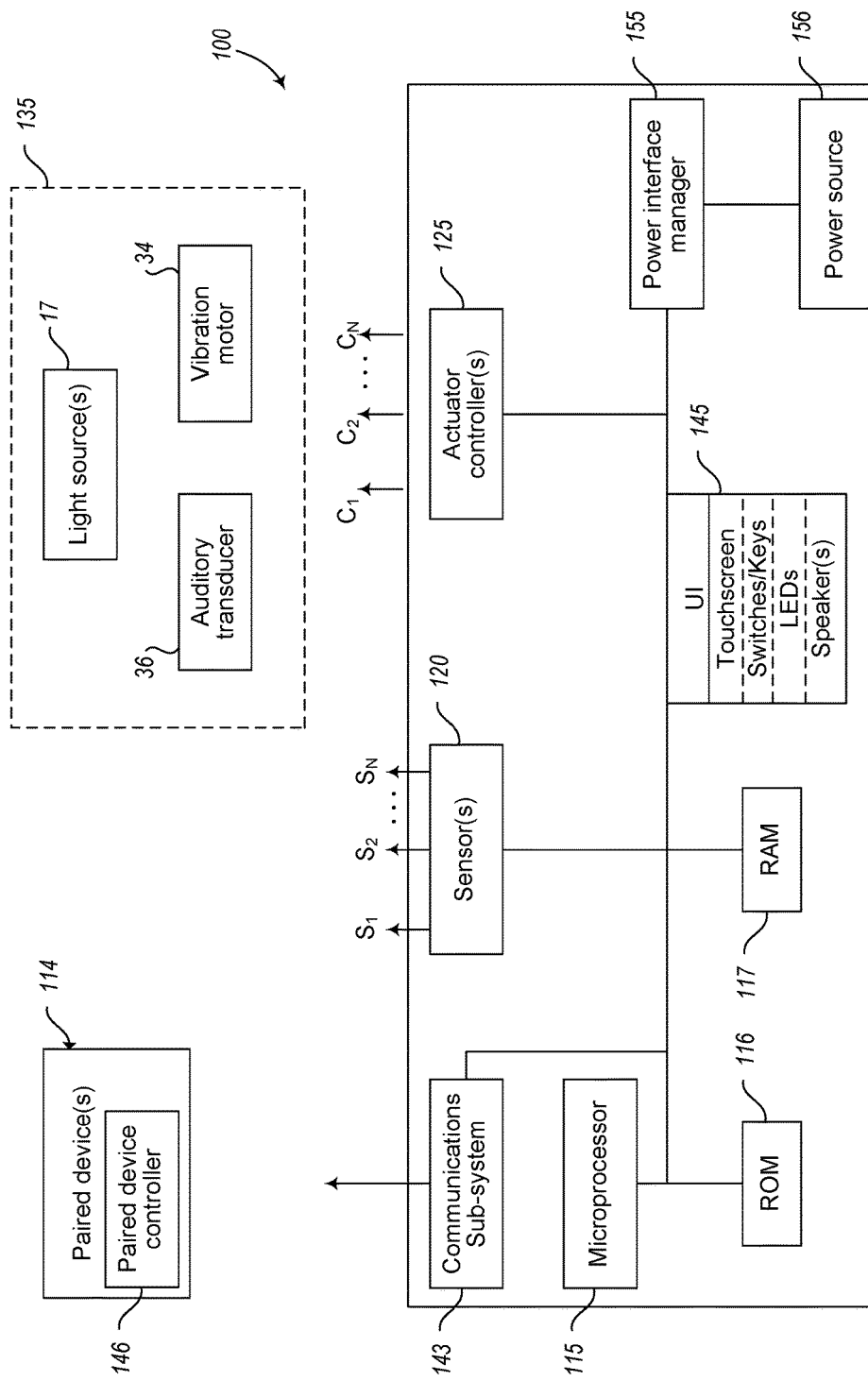
FIG. 6 is a block diagram of an ecosystem, according to one non-limiting, example implementation.

FIG. 6 schematically illustrates an ecosystem 100, according to one example, non-limiting implementation. In particular, the ecosystem 100 can be similar to the ecosystem 10 illustrated in FIG. 1, but schematically illustrates the various control systems, modules, and other sub-systems that operate to create a sense of magic to a user. The ecosystem 100 includes a central control sub-system 110 that establishes a pairing relationship with one or more paired devices 114, such as the one or more remote accessories 14 illustrated in FIGS. 1, 4, and 5. The central control sub-system 110 can be integrated in a sensing implement, such as the sensing implement 12 illustrated in FIGS. 1-3.

The central control sub-system 110 includes a controller 115, for example a microprocessor, digital signal processor, programmable gate array (PGA) or application specific integrated circuit (ASIC). The controller 115 may be similar to controller 42 illustrated in FIGS. 2 and 3 that is integrated in the magic wand 15. The central control subsystem 110 includes one or more non-transitory storage mediums, for example read only memory (ROM) 116, random access memory (RAM) 117, Flash memory (not shown), or other physical computer- or processor-readable storage media. The non-transitory storage mediums may store instructions and/or data used by the controller 115, for example an operating system (OS) and/or applications. The instructions as executed by the controller 115 may execute logic to perform the functionality of the various embodiments described herein, including, but not limited to, logic to establish a pairing relationship with remote accessories, sense occurrence of certain events, actuate various components of a sensing implement, e.g., magic wand 15, any various combinations thereof.

The central control sub-subsystem 110 may include one or more sensors 120 positioned, configured and operable to sense various operation characteristics of the various elements or components of the ecosystem 100. For example, the one or more sensors 120 can include one or more color sensors, e.g., color sensor(s) 30 and motion sensor(s) 31 illustrated in FIG. 3 that are integrated in the magic wand 15. The one or more sensor(s) 120 are communicatively coupled via one or more internal sensor ports to provide signals represented as $S_1 \ldots S_N$ indicative of such to the controller 115, such as a microprocessor. For example, a color sensor, e.g., color sensor 30, can provide a signal to the controller 115 indicative of color detected upon tapping on an object. The motion sensor, e.g., motion sensor 31, can provide a signal to the controller 115 indicative of certain gestures, such as movement of a sensing implement, e.g., magic wand 15, tapping on an object, etc.

The central control sub-system 110 may include one or more actuator controller(s) 125 communicably coupled to the controller 115 to control one or more operational characteristics of the ecosystem 100. For example, the one or more actuator controller(s) 125 can include a motor controller, such as the motor controller 33 illustrated in FIG. 3 that may operate in conjunction with the controller 115. The controller 115 in conjunction with the one or more actuator controller(s) 125, typically, based on sensed conditions and programmed logic, provides control signals $C_1$-$C_N$ to actuators 135 of the ecosystem 100. The actuators 135, in some implementations, may include an auditory transducer(s) 36 of the audio sub-system 35, vibration motor 34 of the motion response sub-system 32, light source(s) 17, etc.

For example, the controller 115 may provide a control signal, e.g., C1, to the light source(s) 17 to cause the light source(s) to emit light which illuminates the sensing implement 12 in a color that matches the color sensed by the one or more sensor(s) 120, such as the color sensor 30. For example, the actuator controller 125, individually or in conjunction with the controller 115, may provide a control signal C2 to the vibration motor 34 to provide tactile or haptic feedback upon lifting of the magic wand 15 to initiate a mode transfer from sleep mode to wake mode, as sensed by the motion sensor 31, tapping on an object to initiate the color sensor 30, or when a color is sensed by the color sensor 30. For example, the controller 115 may provide a control signal, e.g., C3, to the auditory transducer(s) 36 of the audio sub-system 35 to emit sounds indicative of the magic wand 15 being in the wake mode upon movement of the magic wand 15 sensed by the motion sensor 31, or other control signals to emit sounds from the auditory transducer(s) 36 when a color of an object is sensed, or the sensed color, for example, red, green, blue, yellow, etc.

The central control sub-subsystem 110 may include a user interface 145, to allow an end user to operate or otherwise provide input to the ecosystem 100 regarding the operational state or condition of the ecosystem 100. The user interface 145 may include a number of user actuatable controls accessible from the exterior of the ecosystem 100. For example, the user interface 145 may be provided in the magic wand 15 and may include a number of switches or keys operable to turn the magic wand 15 ON and OFF and/or to set various operating parameters of the ecosystem 100. The user interface 145 may also include one or more visual indicators, for instance light emitting diodes (LEDs). The visual indicators may be single color or may be capable of producing different color indicia corresponding to various operational states or conditions of the ecosystem 100.

Additionally, or alternatively, the user interface 145 may include a display, for instance a touch panel display. The touch panel display (e.g., LCD with touch sensitive overlay) may provide both an input and an output interface for the end user. The touch panel display may present a graphical user interface, with various user selectable icons, menus, check boxes, dialog boxes, and other components and elements selectable by the end user to set operational states or conditions of the ecosystem 100. The user interface 145 may also include one or more auditory transducers, for example one or more speakers and/or microphones. Such may allow audible alert notifications or signals to be provided to an end user. Such may additionally, or alternatively, allow an end user to provide audible commands or instructions. The user interface 145 may include additional components and/or different components than those illustrated or described, and/or may omit some components. The switches and keys or the graphical user interface may, for example, include toggle switches, a keypad or keyboard, rocker switches, trackball, joystick or thumbstick. The switches and keys or the graphical user interface may, for example, allow an end user to turn ON the magic wand 15, start or end a color sensing mode, communicably couple or decouple to remote accessories, select from a number of colors, activate or deactivate motor or audio subsystems, or activate or deactivate charging, etc.

The central control sub-subsystem 110 includes a communications sub-system 143 that may include one or more communications modules or components which facilitate communications with various components of one or more paired devices 114. The one or more paired devices 114 may include, for example, remote accessories 14, such as the dress 20, a hand bag 21, a teddy bear 22, as illustrated in FIG. 1, or other remote accessories described herein. The communications sub-system 143 may provide wireless communications to controllers 146 of such paired devices 114, such as the paired device controllers 25. The communications sub-system 143 may include wireless receivers, wireless transmitters or wireless transceivers to provide wireless signal paths to the various remote components or systems of the one or more paired devices 114. The communications sub-system 143 may, for example, include components enabling short range (e.g., via Bluetooth, near field communication (NFC), radio frequency identification (RFID) components and protocols) or longer range wireless communications (e.g., over a wireless LAN, Low-Power-Wide-Area Network (LPWAN), satellite, or cellular network), such as for receiving GPS data, and may include one or more modems or one or more Ethernet or other types of communications cards or components for doing so. The communications sub-system 143 may include one or more bridges or routers suitable to handle network traffic including switched packet type communications protocols (TCP/IP), Ethernet or other networking protocols.

The central control sub-system 110 includes a power interface manager 155 that manages supply of power from a power source 156 to the various components of the central control sub-system 110, for example, the central control sub-system 110 integrated in the magic wand 15. The power interface manager 155 is coupled to the controller 115 and the power source 156. Alternatively, in some implementations, the power interface manager 155 can be integrated in the controller 115. The power source 156 may include external power supply or electrical energy storage devices that are received in the battery compartment 38 of the magic wand 15. The power interface manager 155 may include power converters, rectifiers, buses, gates, circuitry, etc. In particular, the power interface manager 155 can control, limit, restrict the supply of power from the power source 156 based on the various operational states of the ecosystem 100. For example, when the magic wand 15 is in a sleep mode, the power interface manager 155 can restrict or limit the supply of power from the power source 156 to various components of the central control sub-system 110 to conserve power. Upon movement of the magic wand 15 and transition to the wake mode, as sensed by the motion sensor 31, the power interface manager 155 can deliver power to various components of the central control sub-system 110, such as the color sensors 30, or other actuators 135. If upon expiration of a certain defined time interval, no further motion is detected by the motion sensor 31, such as tapping on an object or movement of the magic wand 15, the power interface manager 155 can restrict or limit the supply of power from the power source 156 as the magic wand 15 returns to the sleep mode.

In some embodiments or implementations, the instructions and/or data stored on the non-transitory storage mediums that may be used by the controller, such as, for example, ROM 116, RAM 117 and Flash memory (not shown), includes or provides an application program interface ("API") that provides programmatic access to one or more functions of the central control sub-system 110. For example, such an API may provide a programmatic interface to control one or more operational characteristics of the ecosystem 100, including, but not limited to, one or more functions of the sensor(s) 120, actuator controller(s) 125 and user interface 145. Such control may be invoked by one of the other programs, paired devices 114, actuators 135, other remote device or system (not shown), or some other module. In this manner, the API may facilitate the development of third-party software, such as various different user interfaces and control systems for other devices, plug-ins, and adapters (e.g., for integrating functions of various devices in the interactive apparel ecosystem 100), and the like to facilitate interactivity and customization of the operation and devices within the interactive apparel ecosystem 100.

In an example embodiment or implementation, components or modules of the central control sub-system 110 and other devices within the ecosystem 100 are implemented using standard programming techniques. For example, the logic to perform the functionality of the various embodiments or implementations described herein may be implemented as a "native" executable running on the controller, e.g., microprocessor 115, along with one or more static or dynamic libraries. In other embodiments, various functions of the central control sub-system 110 may be implemented as instructions processed by a virtual machine that executes as one or more programs whose instructions are stored on ROM 116 and/or random RAM 117. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the central control sub-system 110, such as microprocessor 115, to perform the functions of the central control sub-system 110. The instructions cause the microprocessor 115 or some other processor, such as an I/O controller/processor, to process and act on information received from one or more sensor(s) 120 to provide the functionality and operations of the ecosystem 100 described herein.

The embodiments or implementations described above may also use well-known or other synchronous or asynchronous client-server computing techniques. However, the various components may be implemented using more monolithic programming techniques as well, for example, as an executable running on a single microprocessor, or alternatively decomposed using a variety of structuring techniques known in the art, including but not limited to, multiprogramming, multithreading, client-server, or peer-to-peer (e.g., Bluetooth®, NFC or RFID wireless technology, mesh networks, etc., providing a communication channel between the devices within the ecosystem 100), running on one or more computer systems each having one or more central processing units (CPUs) or other processors. Some embodiments may execute concurrently and asynchronously, and communicate using message passing techniques. Also, other functions could be implemented and/or performed by each component/module, and in different orders, and by different components/modules, yet still achieve the functions of the central control sub-system 110.

In addition, programming interfaces to the data stored on and functionality provided by the central control sub-system 110, can be available by standard mechanisms such as through C, C++, C#, and Java APIs; libraries for accessing files, databases, or other data repositories; scripting languages; or Web servers, FTP servers, or other types of servers providing access to stored data. The data stored and utilized by the central control sub-system 110 and overall ecosystem may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules within the ecosystem 100 in different ways, yet still achieve the functions of the central control sub-system 110 and ecosystem 100.

Furthermore, in some embodiments, some or all of the components of the central control sub-system 110 and components of other devices within the ecosystem, such as paired device controller 146, may be implemented or provided in other manners, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 7:
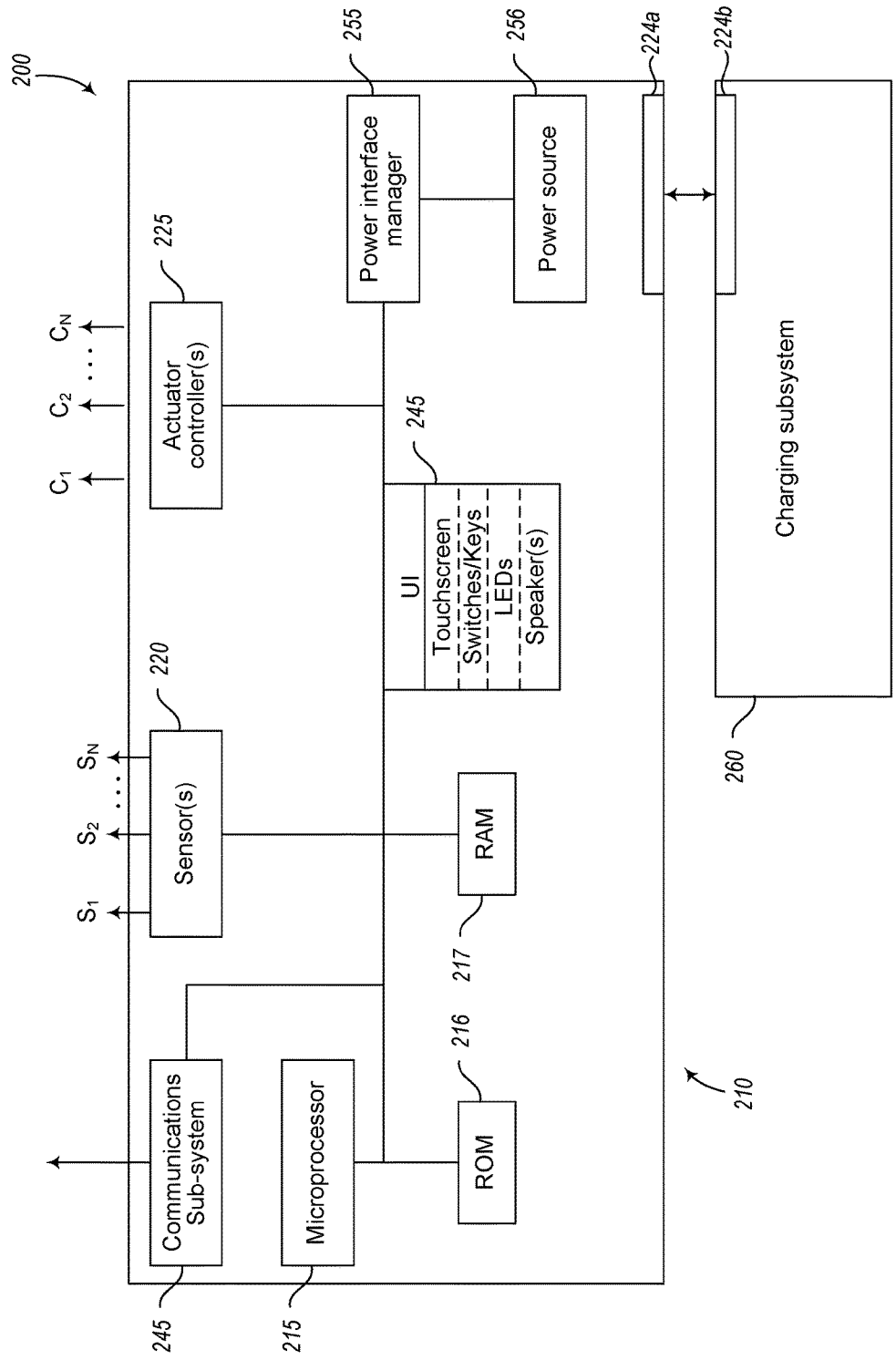
FIG. 7 is a block diagram of an ecosystem that includes a charging sub-system, according to one non-limiting, example implementation.

FIG. 7 illustrates an ecosystem 200, according to an alternative implementation. The ecosystem 200 provides a variation in which a central control sub-system 210 includes a charging subsystem 260 that is coupled to a central control sub-system 210. The central control sub-system 210 is generally similar to the central control sub-system 110 and may include a controller 215, for example, a microprocessor, power interface manager 255, ROM 216, RAM 217, one or more sensors 220, communications sub-system 245, actuator controller(s) 225, actuators (not shown), etc.

In particular, the central control sub-system 210 may include one or more ports 224a to provide control signals to one or more ports 224b of the charging subsystem 260. The ports 224a, 224b may provide bi-directional communications. The charging subsystem 260 can include various electrical and electronic components to charge a power source 256; for example, electrical energy storage devices that are received in the battery compartment 38 of the magic wand 15. The charging subsystem 260 may include one or more power buses or power bus bars, relays, power converters, transformers, contactors or other switches (e.g., insulated gate bipolar transistors or IGBTs, metal oxide semiconductor transistors or MOSFETs), rectifier bridge(s), current sensors, ground fault circuitry, etc. The electrical power is supplied via contacts that can take any of a variety of forms, for instance terminals, leads, posts, etc. The contacts allow electrical coupling of various components.

Figure 8:
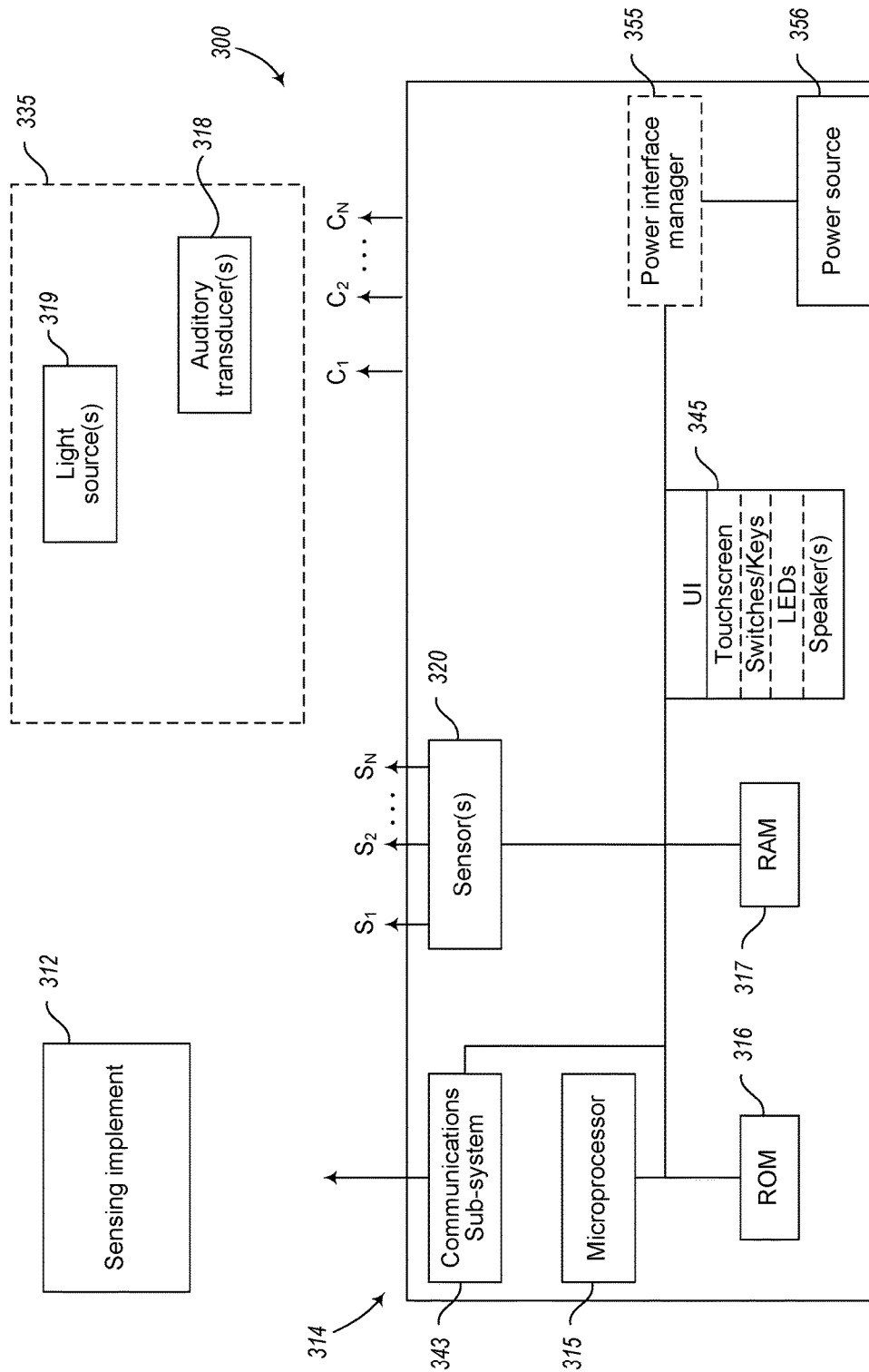
FIG. 8 is a block diagram of an ecosystem that illustrates a paired device control system, according to one non-limiting, example implementation.

FIG. 8 schematically illustrates an ecosystem 300, where a paired device control system 310, according to one example, non-limiting implementation, is illustrated in detail, which is communicably coupled to a sensing implement 312, for example, sensing implement 12. In particular, the paired device control system 310 is communicably coupled to the various implementations of the central control sub-subsystems described herein, for example, central control sub-system 110, 210, etc. The paired device control system 310 can be included in a paired device 314, such as the various remote accessories or paired devices 14, 114, etc., described herein, for example, dress 60, 61, handbag 21, teddy bear 22, or other remote accessories. As such, the one or more ecosystems described herein, for example, ecosystem 10, 100, 200, etc., can include one or more remote accessories 14 having the paired device control system 310.

The paired device control system 310 includes a controller 315, for example a microprocessor, digital signal processor, programmable gate array (PGA) or application specific integrated circuit (ASIC). The controller 315 may be similar to controller 25, 64 illustrated in FIGS. 1 and 4-5 that is integrated in the remote accessory 14. The paired device control system 310 includes one or more non-transitory storage mediums, for example read only memory (ROM) 316, random access memory (RAM) 317, Flash memory (not shown), or other physical computer- or processor-readable storage media. The non-transitory storage mediums may store instructions and/or data used by the controller 315, for example an operating system (OS) and/or applications. The instructions as executed by the controller 315 may execute logic to establish a pairing relationship with sensing implements, sense occurrence of certain events, actuate various components of a remote accessory, for example, dress 60, 61, etc., or any various combinations thereof. The paired device control system 310 may include a user interface 345 similar to the one illustrated in FIG. 7, which allows an end user to operate or otherwise provide input to the one or more remote accessories 14 regarding the operational state or condition thereof.

The paired device control system 310 may include a communications sub-system 343 that may include one or more communications modules or components which facilitate communications with various components of the central control sub-system 110, 210 that is included in the sensing implement. The communications sub-system 343 may be similar to the communication sub-system 143 and include similar components that facilitate wireless communications with the sensing implement.

The paired device control system 310 may optionally include one or more sensor(s) 320. The one or more sensor(s) 320 may include a motion sensor, e.g., motion sensor 66, and a touch sensor, e.g., touch sensor 67. For example, optionally, the touch sensor 67 may be integrated in an activation device, such as activation device 61. The one or more sensor(s) 320 are communicatively coupled via one or more internal sensor ports to provide signals represented as $S_1 \ldots S_N$ indicative of such to the controller 315, such as a microprocessor. For example, a motion sensor, e.g., motion sensor 66, can provide a signal to the controller 315 indicative of certain gestures, such as movement of a user of the paired device 314, for example, a user who has worn a dress, e.g., dress 60. The touch sensor, e.g., touch sensor 67, can provide a signal to the controller 315 indicative of human touch on an activation device, for example, activation device 61.

The controller 315, typically, based on sensed conditions and programmed logic, provides control signals $C_1$-$C_N$ to actuators 335 of the paired device 314. The actuators 335, in some implementations, may include auditory transducer(s) 318, e.g., auditory transducer 71, of an audio sub-system, e.g., audio sub-system 70, light source(s) 319, e.g., light sources 24, 63. For example, the controller 315 may provide a control signal, e.g., C1, to the light source(s) 319 to emit light which illuminates the paired device 314 in a color that matches the color identified by a central control sub-system, e.g., central control sub-system 110, 210, etc. For example, the controller 315 may provide a control signal C2 to the light source(s) 319 to emit light such the paired device 314 is illuminated under a certain animated lighting scheme in response to activation of the activation device, as sensed by the touch sensor 67. For example, the controller 315 may provide a control signal, e.g., C3, to the auditory transducer(s) 318 of the audio sub-system to emit sounds indicative of the paired device 314 being in the wake mode upon movement of the paired device 314 sensed by the motion sensor, e.g., motion sensor 66, or other control signals to emit sounds from the auditory transducer(s) 318 when a color of an object is sensed, or the sensed color, for example, red, green, blue, yellow, etc.

The paired device control system 310 optionally includes a power interface manager 355 that manages supply of power from a power source 356 to the various components of the paired device control system 310. The power interface manager 355 is coupled to the controller 315 and the power source 356. Again, alternatively, the power interface manager 355 can be integrated in the controller 315. The power source 356 may include external power supply or electrical energy storage devices that are received in a battery compartment of the paired device. The power interface manager 355 may include power converters, rectifiers, buses, gates, circuitry, etc. In particular, the power interface manager 355 can control, limit, restrict the supply of power from the power source 356 based on the various operational states of an ecosystem that includes the paired device. For example, when the paired device is in a sleep mode, the power interface manager 355 can restrict or limit the supply of power from the power source 356 to various components of the paired device control system 310 to conserve power. Upon movement of the paired device, as sensed by the motion sensor, and/or upon human touch on the touch sensor, the paired device 314 may transition to wake mode from sleep mode. In the wake mode, the power interface manager 355 may deliver power to various components of the paired device control system 310. If upon expiration of a certain defined time interval, no further motion is detected by the motion sensor and/or the touch sensor, the power interface manager 355 can restrict or limit the supply of power from the power source 356 as the paired device returns to the sleep mode. Moreover, although not illustrated, in some implementations, the paired device control system 310 may be coupled to a charging subsystem similar to the implementation illustrated in FIG. 7.

Figure 9:
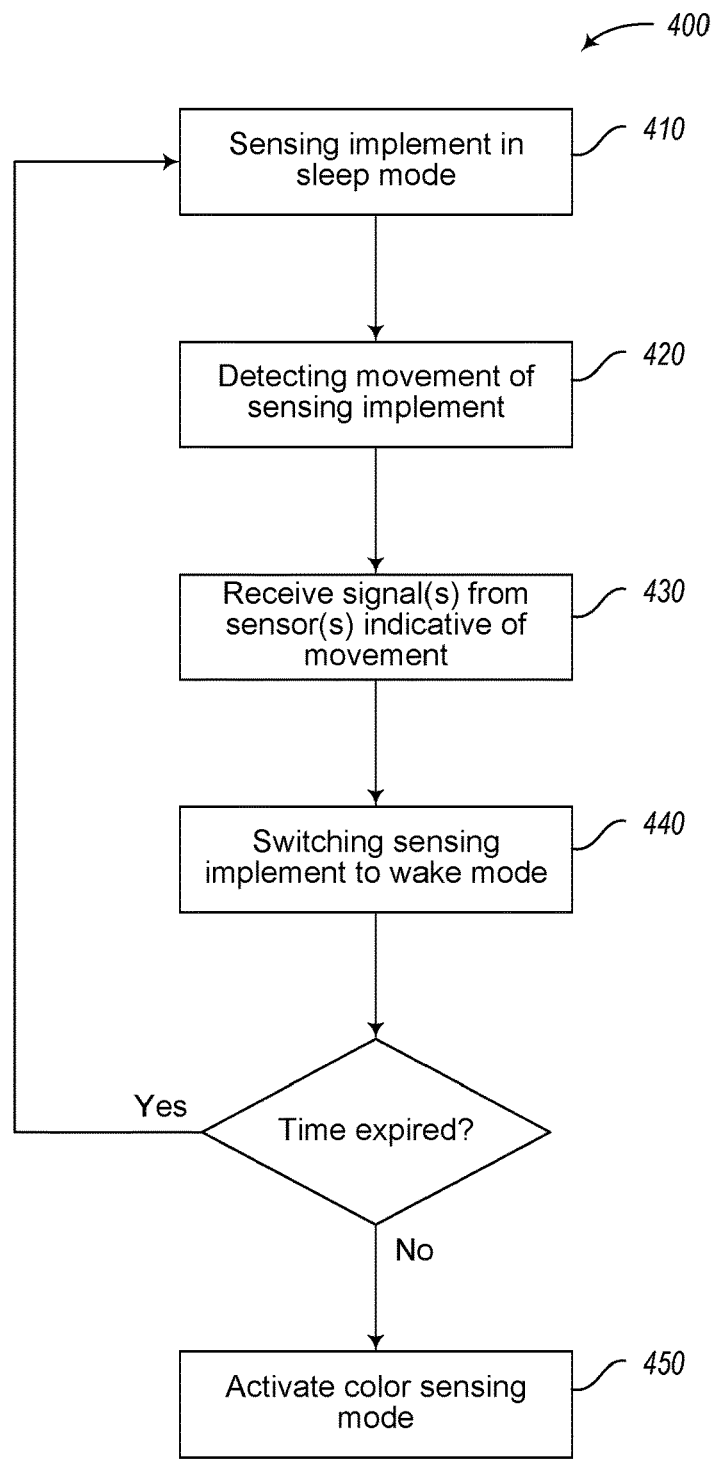
FIG. 9 is a flow diagram illustrating a high level method of activating a color sensing mode of the sensing implement, according to one non-limiting, example implementation.

FIG. 9 is a flow diagram illustrating a high-level method 400, according to one example, non-limiting implementation. The method 400 generally illustrates activation of a sensing implement 12, for example, the magic wand 15, of the one or more implementations of the ecosystems, e.g., ecosystem 10, 100, 200, 300, etc., described herein. At 410, the sensing implement 12 is in a sleep mode, and a power interface manager of a central control subsystem, e.g., power interface manager 155, limits or restricts the delivery of power to the sensing implement 12 from a power source 156, 256, such as one or more electrical energy storage devices disposed in a battery compartment 38 of the magic wand 15.

At 420, movement of the sensing implement 12 is detected when, for example, a user lifts or moves the sensing implement 12. In particular, such movement causes a motion sensor of the ecosystem, for example, the motion sensor 31 to detect such movement. Again, as described above, the motion sensor is configured to capture certain defined gestures or movements and discern between movements that fall outside of a range of certain defined gestures.

At 430, a controller of the ecosystem, for example controller 19, 42, 115, etc., receives one or more signal(s) from the motion sensor indicative of movement of the sensing implement 12 detected at 420. Again, as described above, in some implementations, the controller in lieu of, in addition to, or in conjunction with, the one or more motion sensor(s) can capture certain defined gestures and discern between lifting or general movement of the magic wand 15 and contact with an object, such as tapping of the sensing implement 12 on the object.

At 440, the controller, in response to the one or more signal(s) received from the motion sensor switches the sensing implement 12 to a wake mode from the sleep mode at 420. In the wake mode, the power interface manager that may be integrated in the controller may increase delivery of power from the power source to various components of the sensing implement 12 to activate the sensing implement 12 or various components thereof. Further, in the wake mode, the controller may activate one or more timers to measure one or more time intervals, for example T1, T2, etc.

At 450, the controller activates a color sensing mode in the sensing implement 12. In the color sensing mode, as described in more detail below, the sensing implement 12 is tapped on an object to estimate a color of the tapped object. If, however, no object is tapped on or no movement is detected within the time interval T1, the sensing implement 12 returns to the sleep mode at 410.

Figure 10:
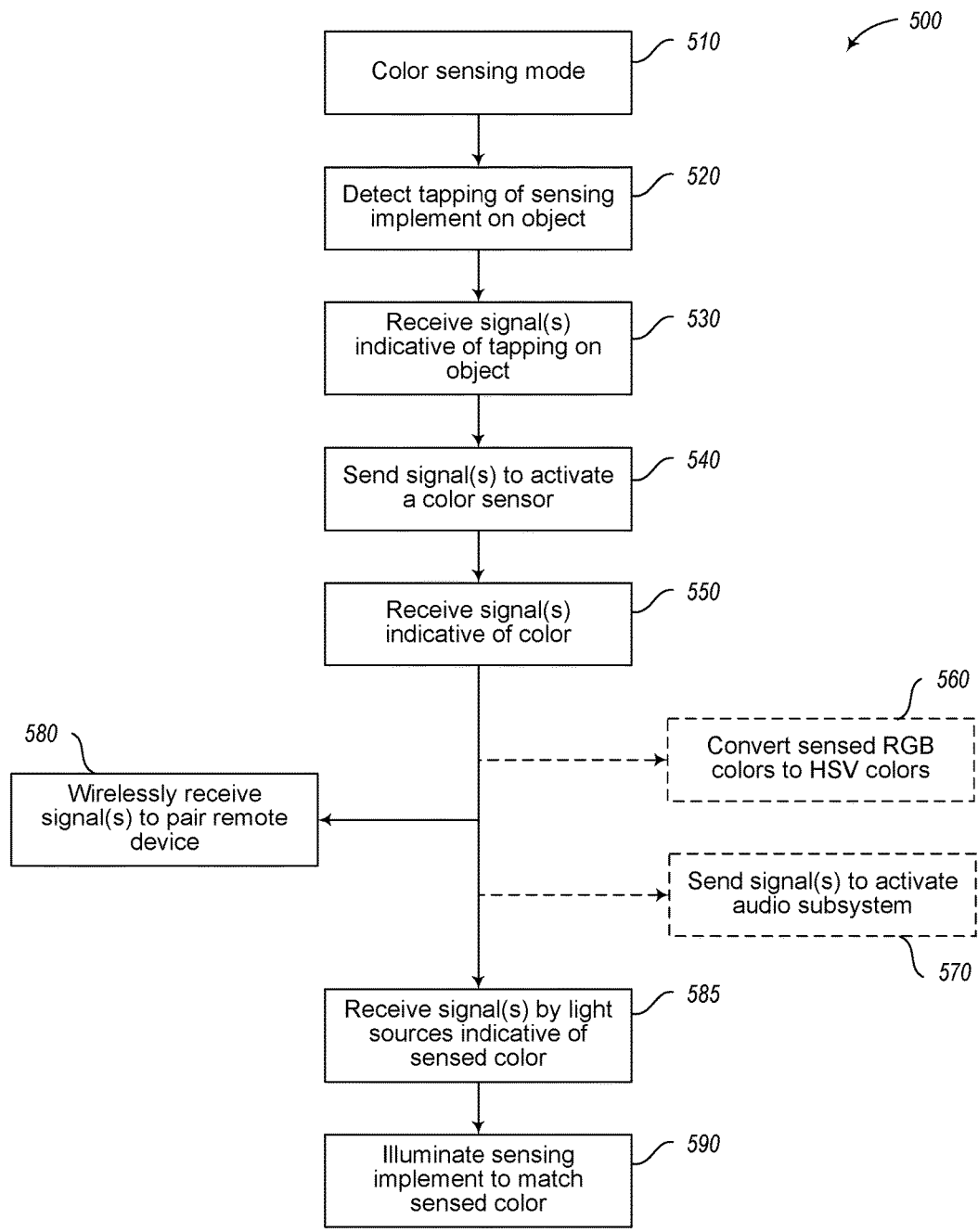
FIG. 10 is a flow diagram illustrating a high level method of operating an ecosystem, according to one non-limiting, example implementation.

FIG. 10 is a flow diagram illustrating a high-level method 500 according to one example, non-limiting implementation. The method 500 generally illustrates one or more operational characteristics of an ecosystem, according to various implementations of ecosystems described herein, for example ecosystem 10, 100, 200, 300, etc. At 510, a sensing implement of the ecosystem, e.g., sensing implement 12, is in a color sensing mode.

At 520, tapping of the sensing implement 12 on an object is detected. For example, a motion sensor of the ecosystem, e.g., motion sensor 31, detects contact of the sensing implement 12 with an object and discerns between certain gestures indicative of tapping on the object and gestures that fall outside the certain defined gestures.

At 530, a controller of the sensing implement of the ecosystem, e.g., controller 19, 42, 115, etc., receives signal(s) from the motion sensor indicative of contact with an object, for example, by tapping of the sensing implement 12 on the object of interest. Again, as described above, in some implementations, the controller in lieu of, in addition to, or in conjunction with, the one or more motion sensor(s) can capture certain defined gestures and discern between lifting or general movement of the sensing implement 12 and contact with an object, such as tapping of the sensing implement 12 on the object.

At 540, the controller sends signal(s) to a color sensor of the ecosystem, e.g., color sensor 30, to activate the color sensor.

At 550, the controller receives signals from the color sensor, indicative of a color sensed by the color sensor.

Optionally, at 560, the controller converts a Red, Green, and Blue ("RGB") color model of the sensed color to a Hue, Saturation, and Value ("HSV") color model. For example, in some implementations, converting the RGB color model to an HSV color model may enhance the colors perceived by the user or other observers. In particular, an HSV color model can allow ease of color manipulation by allowing adjustment or manipulation of one or more parameters, e.g., Hue, Saturation, and Value. For instance, Hue may remain unadjusted or unaltered, while Saturation and Value may be adjusted to obtain more vibrant and brighter colors perceived by the user or other observers. Similarly, one or more parameters may be adjusted or altered while the others may remain unadjusted or unaltered.

Optionally, at 570, the controller sends signal(s) to an audio sub-system of the ecosystem, for example, audio sub-system 35 indicating that a color has been sensed by the color sensor, which causes an auditory transducer of the audio sub-system to emit sound(s) identifying the sensed color, sound effect(s) associated with various color options, or can be any general sound, such as a beep, buzz, etc.

At 580, a paired device of the ecosystem, for example, paired device 314, one or more remote accessories 14, etc., wirelessly receive signal(s) from the controller to establish a paired relationship with the sensing implement 12. For example, a communications sub-system of the controller, e.g., communications sub-system 143, can wirelessly communicate with a communications sub-system, e.g., communication sub-system 343, of a paired device controller, e.g., controller 25, 64, 315, upon sensing of the color at 550 or optionally at 560. Although only one paired device is illustrated for the sake of clarity of description and illustration, as described above, the paired device may include a plurality of paired devices that wirelessly receive signal(s) upon sensing of the color at 550 or optionally at 560.

At 585, light sources of the ecosystem, for example light source(s) 17 disposed in the sensing implement 12, receive signal(s) identifying the color sensed at 550 or optionally at 560. In some implementations, the light sources may receive signal(s) indicative of the sensed color concurrently with, or prior to, wirelessly communicating the sensed color to the paired device at 580.

At 590, the light sources of the ecosystem emit light to illuminate the sensing implement 12, matching the color sensed at 550 or optionally at 560.

Figure 11:
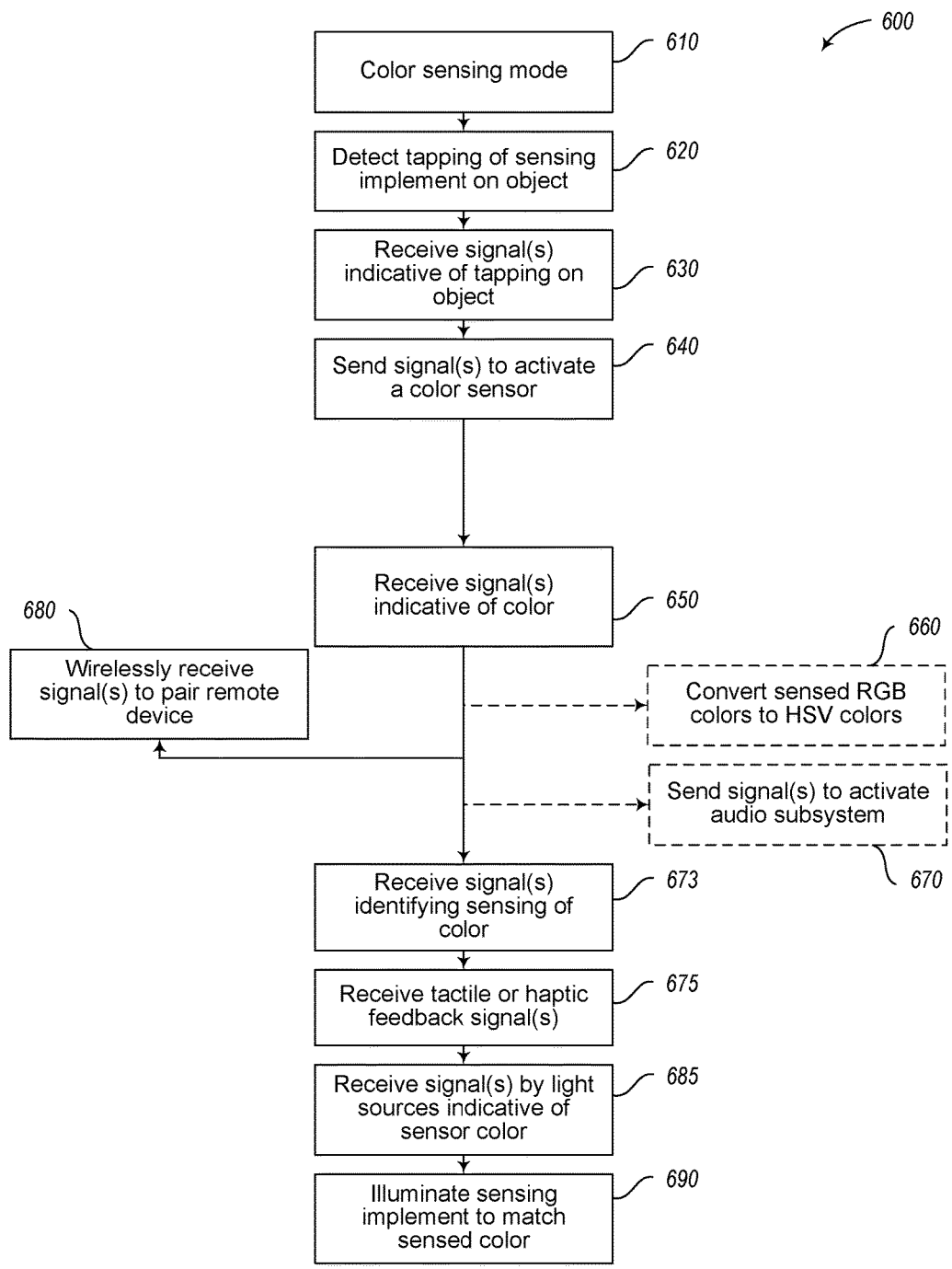
FIG. 11 is a flow diagram illustrating a high level method of operating an ecosystem, according to one non-limiting, example implementation.

FIG. 11 is a flow diagram illustrating a high-level method 600 according to one example, non-limiting implementation. The method 600 generally illustrates one or more operational characteristics of an ecosystem, according to various implementations of ecosystems described herein, for example ecosystem 10, 100, 200, 300, etc.

At 610, a sensing implement of the ecosystem, e.g., sensing implement 12, is in a color sensing mode.

At 620, tapping of the sensing implement 12 on an object is detected. For example, a motion sensor of the ecosystem, e.g., motion sensor 31, detects contact of the sensing implement 12 with an object and discerns between certain gestures indicative of tapping on the object and gestures that fall outside the certain defined gestures.

At 630, a controller of the sensing implement of the ecosystem, e.g., controller 19, 42, 115, etc., receives signal(s) from the motion sensor indicative of contact with an object, for example, by tapping of the sensing implement 12 on the object of interest. Again, as described above, in some implementations, the controller in lieu of, in addition to, or in conjunction with, the one or more motion sensor(s) can capture certain defined gestures and discern between lifting or general movement of the sensing implement 12 and contact with an object, such as tapping of the sensing implement 12 on the object.

At 640, the controller sends signal(s) to a color sensor of the ecosystem, e.g., color sensor 30, to activate the color sensor.

At 650, the controller receives signals from the color sensor, indicative of a color sensed by the color sensor.

Optionally, at 660, the controller converts a Red, Green, and Blue ("RGB") color model of the sensed color to a Hue, Saturation, and Value ("HSV") color model. For example, in some implementations, converting the RGB color model to an HSV color model may enhance the colors perceived by the user or other observers. In particular, an HSV color model can allow ease of color manipulation by allowing adjustment or manipulation of one or more parameters, e.g., Hue, Saturation, and Value. For instance, Hue may remain unadjusted or unaltered, while Saturation and Value may be adjusted to obtain more vibrant and brighter colors perceived by the user or other observers. Similarly, one or more parameters may be adjusted or altered while the others may remain unadjusted or unaltered.

Optionally, at 670, the controller sends signal(s) to an audio sub-system of the ecosystem, for example, audio sub-system 38 indicative of the color sensed by the color sensor, which causes an auditory transducer of the audio sub-system to emit sound(s) identifying the sensed color.

At 673, an actuator controller of the ecosystem, for example, the motor controller 33 of the motion response sub-system 32, receives signal(s) identifying sensing of color at 650 or optionally at 660.

At 675, a motor of the ecosystem, for example a vibration motor 34, receives a signal(s) to cause the motor to provide tactile or haptic feedback to the sensing implement 12, which may indicate to the user that a color has been sensed.

At 680, a paired device of the ecosystem, for example, paired device 314, one or more remote accessories 14, etc., wirelessly receive signal(s) from the controller to establish a paired relationship with the sensing implement 12. For example, a communications sub-system of the controller, e.g., communications sub-system 143, can wirelessly communicate with a communications sub-system, e.g., communication sub-system 343, of a paired device controller, e.g., controller 25, 64, 315, upon sensing of the color at 650 or optionally at 660. Although only one paired device is illustrated for the sake of clarity of description and illustration, as described above, the paired device may include a plurality of paired devices that wirelessly receive signal(s) upon sensing of the color at 650 or optionally at 660.

At 685, light sources of the ecosystem, for example light source(s) 17 disposed in the sensing implement 12, receive signal(s) identifying the color sensed at 650 or optionally at 660. In some implementations, the light sources may receive signal(s) indicative of the sensed color concurrently with, or prior to, wirelessly communicating the sensed color to the paired device at 680.

At 690, the light sources of the ecosystem emit light to illuminate the sensing implement 12, matching the color sensed at 650 or optionally at 660.

Figure 12:
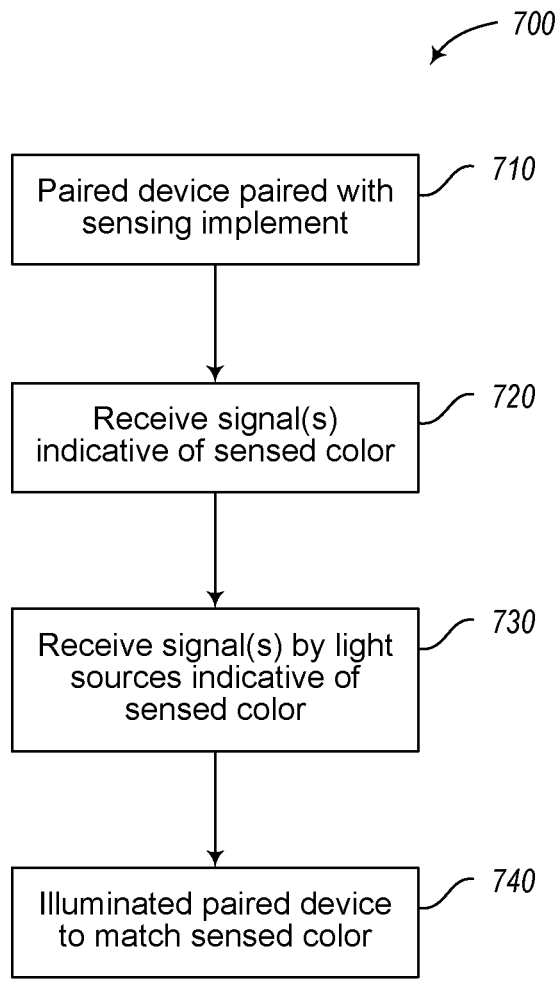
FIG. 12 is a flow diagram illustrating a high level method of operating an ecosystem, according to one non-limiting, example implementation.

FIG. 12 is a flow diagram illustrating a high-level method 700 according to one example, non-limiting implementation. The method 700 generally illustrates one or more operational characteristics of an ecosystem, according to various implementations of ecosystems described herein, for example ecosystem 10, 100, 200, 300, etc.

At 710, a paired device, e.g., paired device 314, remote accessories 14, etc., is in a paired relationship with a controller of the sensing implement, for example, controller 19, 42, 115, etc., disposed in the sensing implement 12. In particular, as described above, a paired device controller of the ecosystem, for example, controller 25, 64, 315 can include a communications sub-system, e.g., communications sub-system 343, that wirelessly receives signal(s) from a communications sub-system of the controller, e.g., communications sub-system 143, to establish a paired relationship with the sensing implement 12 upon sensing of the color, for example, as illustrated in FIGS. 10 and 11 at 580, 680.

At 720, the paired device controller receives signal(s) indicative of the sensed color. For example, upon establishment of the paired relationship, the controller of the sensing implement 12 may send signal(s) to the paired device controller indicative of the sensed color. In other implementations, however, the signal(s) received by the paired controller can be indicative of information in addition to the sensed color. For example, the signal(s) can be indicative of various operational characteristics of the sensing implement 12, such as, for example, if the sensing implement 12 is in a wake mode, sleep mode, color sensing mode, certain defined gestures, etc.

At 730, light sources of the ecosystem disposed in the paired device, for example light sources 24, 63 disposed in the dress 20, 60, 61 receive signal(s) from the paired device controller identifying the sensed color.

At 740, the light sources of the ecosystem disposed in the paired device emit light to illuminate the paired device, matching the color sensed by the sensing implement 12.

Figure 13:
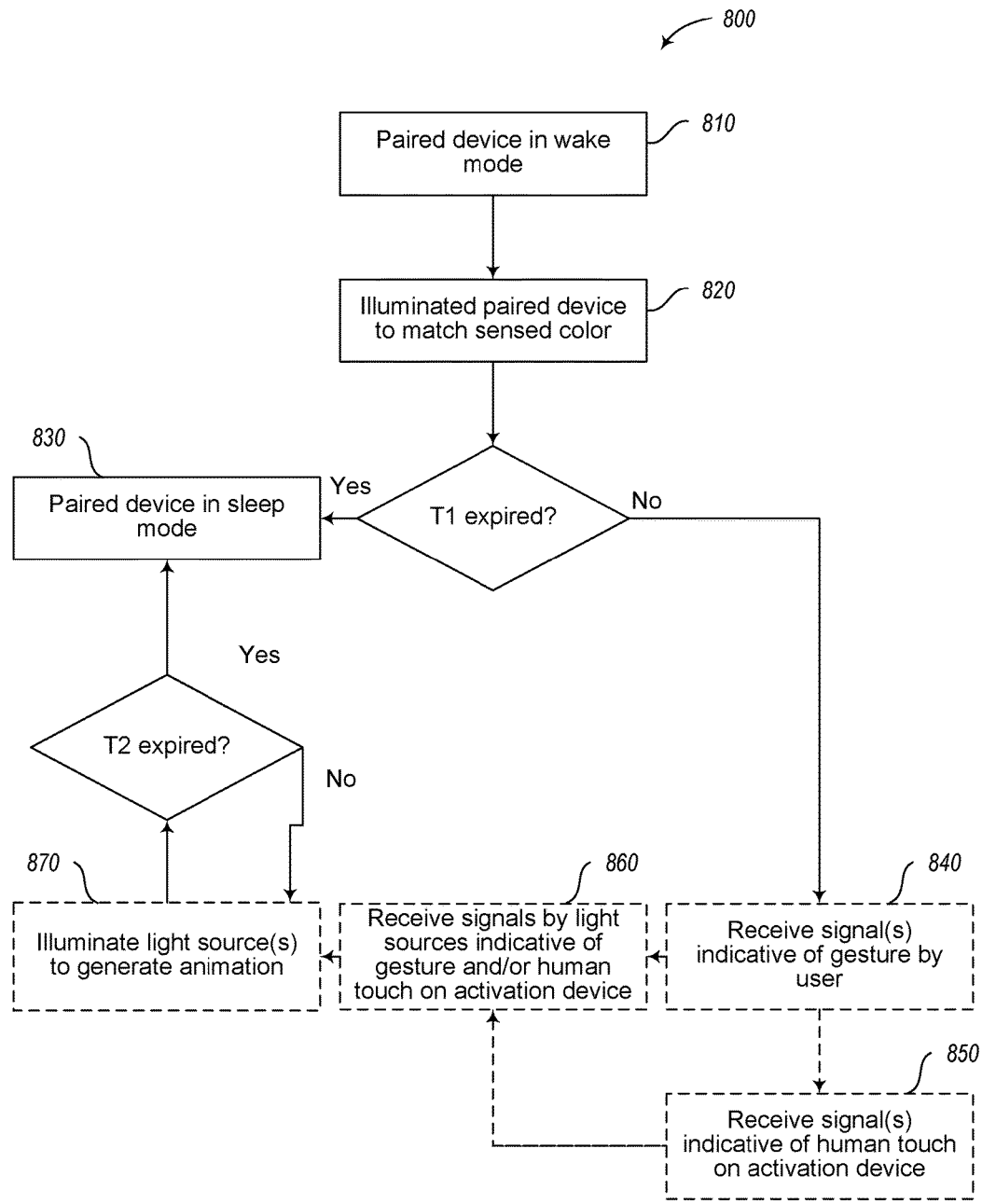
FIG. 13 is a flow diagram illustrating a high level method of operating an ecosystem, according to one non-limiting, example implementation.

FIG. 13 is a flow diagram illustrating a high-level method 800 according to one example, non-limiting implementation. The method 800 generally illustrates one or more operational characteristics of an ecosystem, according to various implementations of ecosystems described herein, for example ecosystem 10, 100, 200, 300, etc.

At 810, a paired device, e.g., paired device 314, remote accessories 14, etc., is in wake mode. In particular, the paired device may receive power from a power interface manager, e.g., power interface manager 355, from a power source, e.g., power source 356, upon establishment of a paired relationship with a sensing implement, to switch the paired device from sleep mode to wake mode. Additionally or alternatively, the paired device may be in the wake mode upon movement of the paired device, for example, as triggered by certain gestures.

At 820, light sources, e.g., light sources 24, 63, of the ecosystem disposed in the paired device emit light to illuminate the paired device, matching the color sensed by the sensing implement 12, as described above. Further, in the wake mode, upon illumination of the paired device, a controller, e.g., controller 25, 64, 315, may activate one or more timers to measure one or more time intervals, for example T1, T2, etc. If, upon expiration of a time interval, for example, T1, no further certain defined events occur, the paired device switches to the sleep mode at 830.

Optionally, at 840, the controller of the paired device receives signal(s) from a motion sensor, e.g., motion sensor 66, indicative of certain gestures of the paired device. For example, such gestures may include standing, moving, lying down, running, etc.

Optionally, at 850, in addition or alternative to identification of occurrence of certain defined gestures at 840, the controller of the paired device receives signal(s) from a touch sensor, e.g., touch sensor 67, indicative of human touch on an activation device disposed in the paired device, e.g., activation device 61.

Optionally, at 860, light sources of the ecosystem disposed in the paired device, for example light sources 24, 63 disposed in the dress 20, 60, 61, receive signal(s) from the paired device controller identifying occurrence of certain defined gestures at 840 and/or human touch on an activation device at 850.

Optionally, at 870, the light sources of the ecosystem disposed in the paired device emit light to illuminate the paired device under an animated lighting scheme.

Further, upon illumination of the paired device at 870, the controller may activate one or more timers to measure one or more time intervals, for example T2. Upon expiration of time interval T2, the paired device returns to the sleep mode at 830.

Moreover, the various implementations described above can be combined to provide further embodiments. For example, while activation devices, such as touch sensors, may be employed and/or disposed in sensing implements in lieu of one or more remote accessories or paired devices. For example, in some implementations, the sensing implement may be operable to generate animation or lighting schemes in the one or more remote accessories or paired devices. In some implementations, the sensing implements and/or the paired devices or remote accessories can be paired with various display devices, such as smart televisions, e.g., Apple® TV, etc. The sensing implements and/or the paired devices or remote accessories can be operable to control content being displayed on the display devices, such as specific movie, show, or programs being played. The sensing implements and/or the paired devices or remote accessories when paired may be operable to illuminate the sensing implement and/or the remote accessories to change or match color of color sensed of a character being viewed in the content. In some implementations, the sensing implement and/or the remote accessories or paired devices may illuminate certain animation or lighting schemes based on gestures of the characters being viewed in the content. In some implementations, the sensing implements and/or the paired devices or remote accessories can operate at various theme parks, concerts, parks, performances, or other attractions and/or events. For example, the sensing implement can bi-directionally communicate with a paired device or remote accessory that is worn by characters or people in theme parks, concerts, parks, performances, etc., or is more generally present in such locations to illuminate light sources to change or match color as described in various implementations. For example, the one or remote accessories, e.g., dresses, can bi-directionally communicate with exhibits and/or installations in theme parks, concerts, parks, performances, etc. to illuminate colors and/or animation patterns.

Moreover, these and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An ecosystem, comprising:
a sensing implement including one or more sensing implement light sources;
one or more remote accessories including one or more accessory light sources; and
control circuitry that communicably couples the sensing implement to the one or more remote accessories, the control circuitry, which in operation:
determines a color of an object based on one or more signals received indicative of the color of the object;
generates one or more signals to cause the one or more sensing implement light sources to illuminate the sensing implement in a color that substantially matches the color of the object; and
generates one or more signals to cause the one or more accessory light sources to illuminate the one or more remote accessories in a color that substantially matches the color of the object.

2. The ecosystem of claim 1 further comprising one or more color sensors.

3. The ecosystem of claim 2 wherein the one or more color sensors are activated upon contact with the object.

4. The ecosystem of claim 1 further comprising one or more sensors that selectively sense movement of the sensing implement.

5. The ecosystem of claim 1 wherein the control circuitry generates one or more signals to selectively pair the sensing implement with the one or more remote accessories based, at least in part, on sensing of the color of the object.

6. The ecosystem of claim 1 further comprising a power source that supplies power to the sensing implement.

7. The ecosystem of claim 6 wherein the control circuitry generates one or more signals to selectively deliver power from the power source to the sensing implement when the sensing implement is in a wake mode.

8. The ecosystem of claim 6 wherein the control circuitry generates one or more signals to selectively limit delivery of power from the power source to the sensing implement when the sensing implement is in a sleep mode.

9. The ecosystem of claim 1 wherein the sensing implement further comprises a magic wand.

10. The ecosystem of claim 1 wherein the one or more remote accessories further comprises a dress.

11. The ecosystem of claim 1 wherein the control circuitry further generates one or more signals that provide haptic feedback to the sensing implement following determining the color of the object.

12. A method comprising:
receiving, by at least one microprocessor, one or more signals from a sensing implement, the one or more signals identifying a color of an object;
in response to the received one or more signals from the sensing implement, illuminating, by at least one microprocessor, the sensing implement in a color that substantially matches the color of the object via one or more sensing implement light sources;
communicating wirelessly, by the at least one microprocessor, one or more signals to one or more remote accessories, the one or more signals indicative of the color of the object; and
causing, by the communicating wirelessly the one or more signals to one or more remote accessories, the one or more remote accessories to illuminate in a color that substantially matches the color of the object via one or more remote accessory light sources.

13. The method of claim 12 wherein identifying the color of the object includes sensing the color of the object via a color sensor disposed in the sensing implement.

14. The method of claim 12 further comprising selectively delivering power to the sensing implement from a power source in response to movement of the sensing implement.

15. The method of claim 12 further comprising providing at least one or more of haptic feedback and tactile feedback in response to receiving, by the at least one microprocessor, the one or more signals identifying the color of the object.

16. A system comprising:
a sensing implement;
one or more light sources disposed in the sensing implement;
a color sensor disposed in the sensing implement, which in operation, generates one or more signals indicative of a color of an object;
one or more remote accessories;
one or more accessory light sources disposed in the one or more remote accessories; and
control circuitry coupled to the sensing implement, which, in operation:
determines color based on the one or more signals indicative of the color of the object;
communicates with the one or more light sources disposed in the sensing implement to cause the sensing implement to illuminate in a color that substantially matches the color of the object; and
communicates with the one or more remote accessories the determined color of the object to cause the one or more remote accessories to illuminate in the color that substantially matches a color of the object.

17. The system of claim 16 further comprising a motion sensor disposed in the sensing implement, the motion sensor, in operation, responds to one or more signals indicative of contact of the sensing implement with the object.

18. The system of claim 16 wherein the control circuitry selectively generates one or more signals that provide haptic feedback to the sensing implement in response to determining the color of the object.

19. The system of claim 16 wherein the sensing implement comprises a magic wand.

20. The system of claim 16 further comprising an auditory transducer, which, in operation, responds to the one or more signals indicative of determining the color of the object.

21. An ecosystem comprising:
a sensing implement including:
one or more sensors to estimate a color of an object; and
one or more sensing implement light sources;
one or more remote accessories including one or more accessory light sources;
at least one controller, communicably coupled to the one or more sensors, the at least one controller to receive one or more signals from the one or more sensors, each of the one or more signals including data indicative of a color sensed by the one or more sensors;
a controller-readable, machine-executable, instruction set stored in a nontransitory storage medium communicably coupled to the at least one controller, that when executed by the at least one controller, causes the at least one controller to at least:
determine the color of the object;
responsive at least in part to the determination of the color, provide at least one color output signal to the sensing implement light sources; and communicate the at least one color output signal to the one or more accessory light sources.

22. The ecosystem of claim 21 wherein the one or more sensors include a color sensor and a motion sensor, the motion sensor is communicably coupled to the at least one controller to receive one or more signals that include data indicative of contact of the sensing implement with the object.

23. The ecosystem of claim 22 wherein the controller-readable, machine-executable, instruction set includes additional instructions that further cause the at least one controller to:
    determine contact of the sensing implement with the object; and
    responsive at least in part to the contact, provide the at least one color output signal to the sensing implement light sources.

24. The ecosystem of claim 22 wherein the controller-readable, machine-executable, instruction set includes additional instructions that further cause the at least one controller to:
    responsive at least in part to movement of the sensing implement, selectively adjust delivery of power to the sensing implement.

25. The ecosystem of claim 22 wherein the controller-readable, machine-executable, instruction set includes additional instructions that further cause the at least one controller to:
    responsive at least in part to the determination of the color, provide at least one or more of an auditory feedback output signal and a haptic feedback output signal to the sensing implement.

26. A sensing implement operable in an ecosystem, the sensing implement comprising:
    one or more color sensors which sense a color of an object;
    one or more light sources;
    one or more motion sensors that detect movement of the sensing implement; and
    a controller communicably coupled to the one or more sensors and the one or more motion sensors, the controller, in response to sensing of the color of the object, causing the one or more light sources to illuminate the sensing implement in a color that substantially matches the color of the object sensed by the one or more color sensors.

27. The sensing implement of claim 26 wherein movement of the sensing implement includes contact with the object.

28. The sensing implement of claim 26, further comprising:
    a motion response sub-system that provides one or more of tactile or haptic feedback.

29. The sensing implement of claim 26, further comprising:
    an audio sub-system that includes one or more auditory transducers.

30. The sensing implement of claim 26, further comprising:
    a communications sub-system that communicably couples the sensing implement to one or more paired devices of the ecosystem.

* * * * *